(12) United States Patent
Kabeya et al.

(10) Patent No.: US 7,992,786 B2
(45) Date of Patent: Aug. 9, 2011

(54) BAR CODE READER

(75) Inventors: Akifumi Kabeya, Sagamihara (JP);
Norikazu Urata, Hachioji (JP)

(73) Assignee: Olympus Corporation, Tokyo (JP)

( * ) Notice: Subject to any disclaimer, the term of this patent is extended or adjusted under 35 U.S.C. 154(b) by 1021 days.

(21) Appl. No.: 11/894,857

(22) Filed: Aug. 22, 2007

(65) Prior Publication Data
US 2009/0145968 A1 Jun. 11, 2009

(51) Int. Cl.
*G06K 7/10* (2006.01)
(52) U.S. Cl. .............. 235/462.43; 235/454; 235/462.01; 235/462.32; 235/472.01
(58) Field of Classification Search .................. 235/454, 235/462.01, 462.32, 462.43, 462.23, 472.01; 359/198, 198.1
See application file for complete search history.

(56) References Cited

U.S. PATENT DOCUMENTS

| | | | | |
|---|---|---|---|---|
| 4,019,026 | A | * | 4/1977 | Nakanishi et al. ....... 235/462.35 |
| 4,874,933 | A | * | 10/1989 | Sanner ........................ 235/470 |
| 5,099,109 | A | * | 3/1992 | Ishikawa et al. ......... 235/462.23 |
| 6,021,946 | A | * | 2/2000 | Hippenmeyer et al. .. 235/462.22 |
| 6,119,942 | A | * | 9/2000 | Pierenkemper et al. . 235/462.22 |
| 6,303,927 | B1 | | 10/2001 | Ahten et al. |
| 6,360,949 | B1 | | 3/2002 | Shepard et al. |
| 2007/0119942 | A1 | * | 5/2007 | Barsotti et al. ........... 235/462.24 |

FOREIGN PATENT DOCUMENTS

JP    2002-183658 A    6/2002

* cited by examiner

*Primary Examiner* — Thien M. Le
*Assistant Examiner* — April A Taylor
(74) *Attorney, Agent, or Firm* — Holtz, Holtz, Goodman & Chick, PC

(57) ABSTRACT

There is provided a bar code reader arranging a diaphragm member in which a through hole for an emission diaphragm and a through hole for a field diaphragm are formed as one body on an optical path between a laser light source and a scanning unit, in such a way that the both holes extend over an emission optical path along which emitted laser light is emitted, and a return optical path along which return light reflected from a bar code returns.

16 Claims, 20 Drawing Sheets

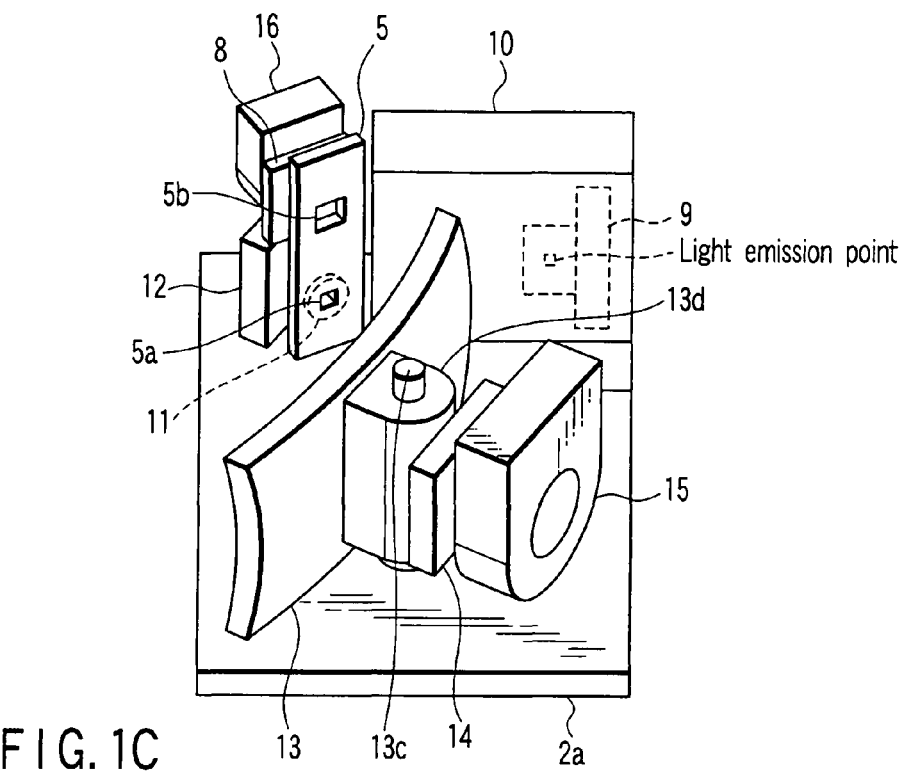
F I G. 1C
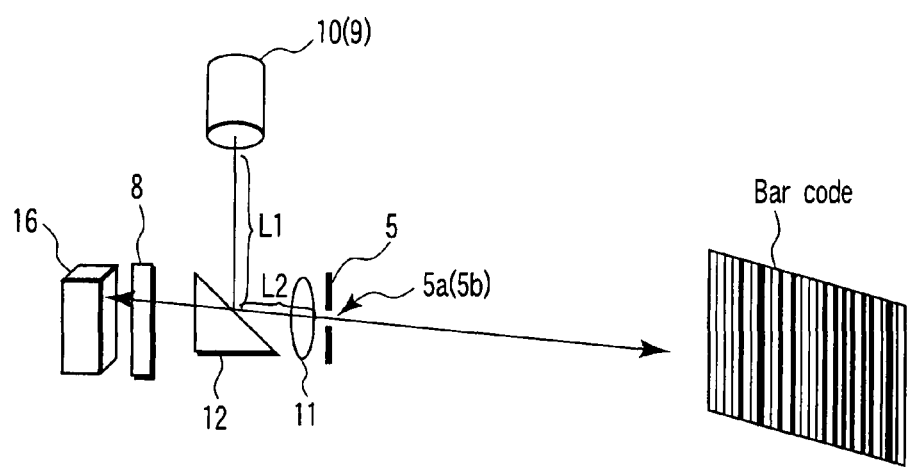
F I G. 2

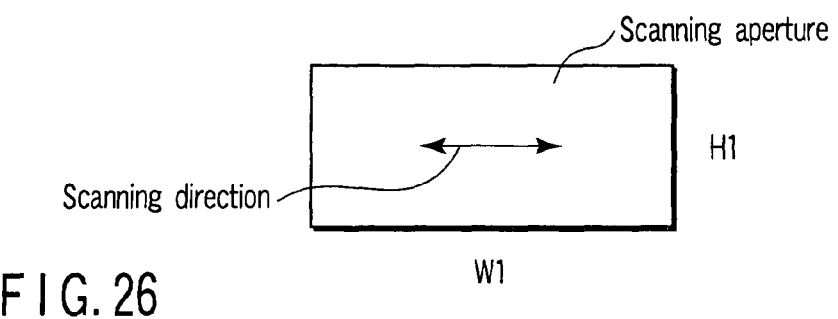
F I G. 26
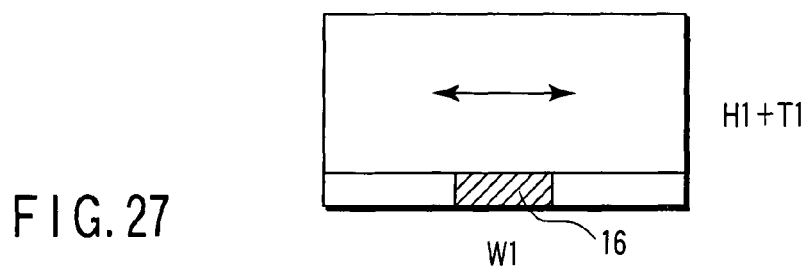
F I G. 27
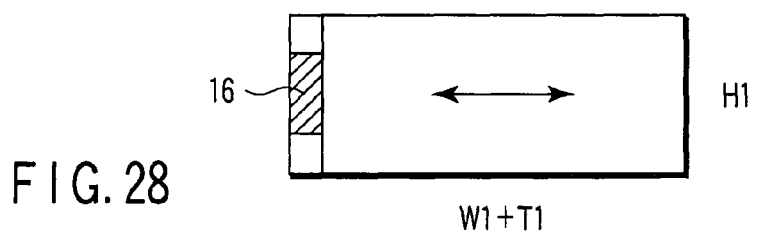
F I G. 28
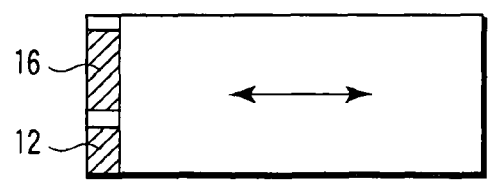
F I G. 29

BAR CODE READER

BACKGROUND OF THE INVENTION

1. Field of the Invention

The present invention relates to a bar code reader which irradiates laser light onto a symbol such as a bar code, receives reflected return light, and reads information from the symbol.

2. Description of the Related Art

Generally, the bar code is read by the bar code-reader to generate recorded information. The bar code-reader irradiates laser light from a laser light source such as a laser diode (LD) for scanning, and receives reflected return light (reflected light) including information by a light receiving element such as a photo-detector (PD). A light receiving element generates a detection signal after photoelectric conversion of the received return light. The detection signal is decoded and recognized as information.

A user directs the bar code reader toward a bar code to be read, to irradiate laser light thereon. In a case in which other unnecessary ambient light caused by an in-situ environment, for example, illuminating rays and sun rays are mixed into the return light when the return light is received, there is caused a situation in which larger noises are generated and information may not be correctly read. For example, Jpn. Pat. Appln. KOKAI Publication No. 2002-183658 has disclosed a configuration as a bar code reader preventing the above situation. According to the configuration, there is provided a light shielding portion covering a range except a light receiving surface (through hole). Moreover, laser light emitted from a laser diode is polarized into parallel light flux through a collimator lens and is formed into a thin beam by a diaphragm portion for irradiation according to the above configuration. The above bar code reader correctly reads information by a configuration in which small-diameter laser light is irradiated by providing the through hole and the diaphragm portion, and other unnecessary ambient light is prevented from entering.

Moreover, a smaller and lighter bar code reader with a module structure has been manufactured along with development of technologies, and various kinds of electronic devices such as a portable device with a wireless communication function have been equipped with the bar code reader. For example, U.S. Pat. Nos. 6,360,949, 6,303,927, and the like have proposed such an electronic device.

The above U.S. Pat. No. 6,360,949 has tried to modularize a laser scanning optical system called a retro collective system. That is, according to the system configuration, laser light is emitted using a plate mirror for scanning, and return light is taken into a photo-detector using a light condensing mirror. A smaller size is realized by returning incidence light by the use of two mirrors.

U.S. Pat. No. 6,303,927 has disclosed a configuration in which return light is taken into a photo-detector, using not a light condensing mirror but a light condensing lens as a light condensing element. There is an arrangement in which the light taken into the detector is deflected through about 90° by a scanning mirror, and is directed from the light condensing lens toward the photo-detector. An object of this technology is to realize higher-performance reading by a configuration in which the light condensing lens is arranged in the vicinity of a scanning aperture in parallel to the laser light source.

When the size of the scanning mechanism is made smaller and modularized as described above, for example, a portable terminal with a wireless function may be equipped with the mechanism. As a result, inspection processing and object authentication may be automated even outdoors, and in a mobile unit such as an automobile and an airplane in which the scanning mechanism has not been used so far. Accordingly, the scope of application of the product may be extended, and the convenience may be remarkably improved. Such a bar code reader has been widely used in home delivery service, logistics service, a food industry, and the like under a state in which a portable terminal is equipped with the bar code reader. Moreover, application to, for example, an inter-vehicle sensor, a safety and crime-prevention device, and the like may be also realized by applying the modularization technology to an object recognition sensor and the like.

When such a smaller and lighter reader with a module structure is realized, various kinds of examinations have been made in order to realize higher-performance reading, and to execute assembly work, inspection processing, and adjustment operation in an easier manner.

BRIEF SUMMARY OF THE INVENTION

The present invention provides a bar code reader which has a smaller size and a lighter weight, and in which an optical axis accuracy is improved at low cost by simple assembly inspection work to improve reading performance.

An embodiment of the present invention provides a bar code reader comprising: light source means for emitting a light flux; deflecting means for deflecting the emitted light from the light source means; scanning means for scanning the emitted light deflected by the deflecting means toward a bar code; light condensing means for condensing return light from the bar code; light receiving means for receiving the return light condensed by the light condensing means; and an integrally molded diaphragm member which is arranged extending over an emission optical path between the deflecting means and the scanning means and a return optical path between the light condensing means and the light receiving means, and in which a through hole for an emission diaphragm is formed on the emission optical path, and a through hole for a field diaphragm is formed on the return optical path.

In addition, an embodiment of the present invention provides a bar code reader comprising: light source means; deflecting means having a deflecting surface by which emitted light emitted from the light source means is deflected; scanning means for emitting light deflected by the deflecting means toward a bar code for scanning; light condensing means for condensing return light from the bar code; light receiving means for receiving return light condensed by the light condensing means; and a fixed base which supports the deflecting means, wherein the deflecting means is supported by the fixed base in a rotation adjustable manner, and the deflecting means is supported by the fixed base in such a way that the rotation center of the deflecting means coincides with the extended portion of the deflecting surface.

Furthermore, an embodiment of the present invention provides a bar code reader comprising: light source means; scanning means for scanning emitted light from the light source means toward an object; reflecting and light condensing means for reflecting and condensing return light from the object; light receiving means for receiving the return light reflected and condensed by the reflecting and light condensing means; and a housing which mounts thereon the light source means, the scanning means, the reflecting and light condensing means, and the light receiving means, and has a scanning aperture through which emitted light from the scanning means and reflected light from the object transmit, wherein the reflecting and light condensing means is mounted on the housing in such a way that an angle formed by a perpendicular line of the scanning aperture, and a straight line connecting the center of the reflecting and light condensing means and the center of the light receiving means is about 60 degrees.

BRIEF DESCRIPTION OF THE SEVERAL VIEWS OF THE DRAWINGS

FIG. 1C is a perspective view showing the internal configuration seen from the back side, wherein the side wall portion is removed;

FIG. 2 is a schematic view showing a configuration and an optical path according to the first embodiment;

FIG. 26 is a view explaining an example in which a photo-detector is arranged in the vicinity of a scanning aperture provided on the front of a general bar code reader;

FIG. 27 is a view explaining an example in which the photo-detector is arranged in the lower or upper portion of the scanning aperture;

FIG. 28 is a view explaining an example in which the photo-detector is arranged at the end side of the scanning aperture in the right and left direction;

FIG. 29 is a view explaining an example in which the photo-detector and a deflection mirror are arranged at the end side of the scanning aperture in the right and left direction;

DETAILED DESCRIPTION OF THE INVENTION

Hereinafter, embodiments according to the present invention will be explained in detail referring to drawings.

Figure 1A:
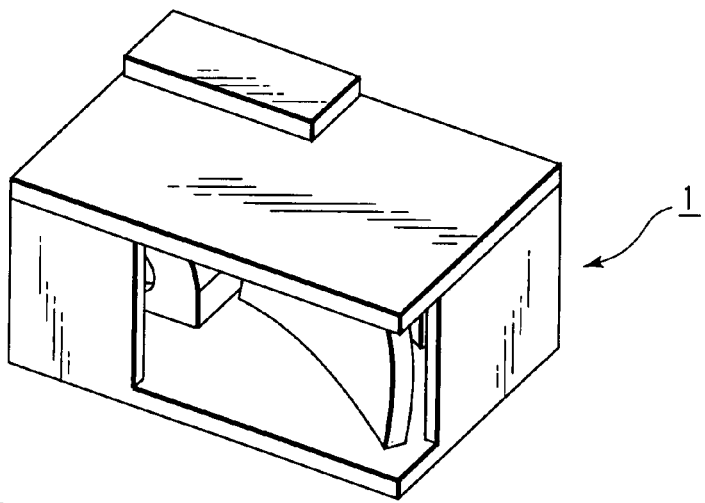
FIG. 1A is a perspective and general view showing an external appearance of a bar code reader according to a first embodiment.
Figure 1B:
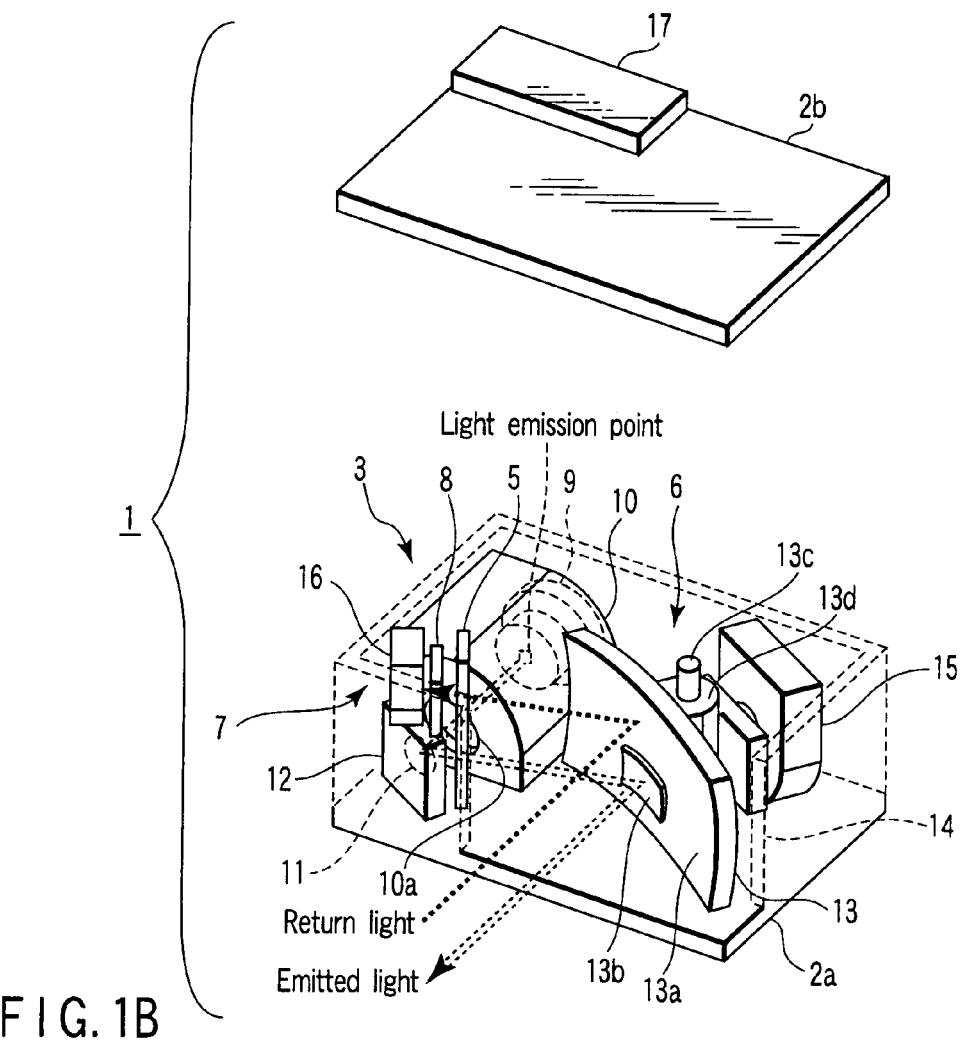
FIG. 1B is a perspective view of an internal configuration seen from the front side, wherein the side wall portion is represented by dotted lines.

A first embodiment according to the present invention will be explained referring to the drawings. FIG. 1A is a perspective and general view showing an external appearance of a bar code reader according to the first embodiment, FIG. 1B is a perspective view showing an internal configuration, wherein the side wall portion is represented by dotted lines, and FIG. 1C is a perspective view showing the internal configuration seen from the back side, wherein the exterior member (wall portion) is removed. The bar code reader which has been actually made has a rectangular parallelepiped shape with an external dimension of, for example, about 21 mm in width, about 14 mm in depth, and about 11 mm in height.

In a bar code reader 1 shown in FIG. 1A, a housing 2 as an exterior member includes a chassis member 2a, and a substrate unit 2b as an upper lid.

The chassis member 2a supports units and members, which will be described later, as one body, and has a set-up surface for external devices on a not-shown undersurface. The above chassis member 2a is formed of a metallic material, such as aluminum, having enough strength resisting impacts such as a drop impact. Furthermore, it is acceptable to use alloy metal or hard resin which does not cause thermal deformation as the above metallic material. Mainly, a light source unit 3, a deflection mirror 12, a diaphragm portion 5, a scanning unit 6, and a detection unit 7 are installed on the chassis member 2a. As shown in FIG. 1C, the diaphragm portion 5 according to the present embodiment has a configuration in which a laser-diode (LD) emission diaphragm 5a is provided in the lower portion of one plate-like member as one diaphragm (through hole), and a PD field diaphragm 5b is also provided in the upper portion of one plate-like member as one diaphragm (through hole). The details will be described later.

The light source unit 3 includes: a laser diode (LD) 9 as light source means for emitting laser light; an accommodation portion 10 accommodating the LD 9; a collimator lens 11 collimating the laser light; a deflection mirror 12 as deflecting means for directing the laser light toward the scanning unit 6 through deflection by reflection; and the LD emission diaphragm 5a focusing the light flux cross section of the laser light reflected from the deflection mirror 12 to a desired spot size. There may be obtained a light source, which is extremely cheap, and has high visibility, by a configuration in which the laser diode 9 has a specification of an external diameter of 5.6 mm, and a wavelength of 650 nm, wherein the specification has been widely adopted for, for example, a DVD player.

According to the above configuration, the laser light irradiated from the laser diode 9 is reflected from the deflection mirror 12, and, furthermore, is emitted onto the scanning unit 6 after the laser light is collimated by the collimator lens 11, passes through the LD emission diaphragm 5a, and is formed to have the desired spot size.

The scanning unit 6 includes: a scanning mirror 13 including a concave mirror 13a as light condensing means on the front side, and a plane mirror 13b, which is formed as one body in the nearly center portion and functions as scanning means; a magnet 14 mounted on a supporting member 13d rotatably supporting a rotating shaft 13c, which is provided on the back side of the scanning mirror 13; and a coil 15 which reciprocatingly swings to the magnet 14 by electromagnetic force. Here, the above members of the supporting member 13d, the magnet 14, and the coil 15 form the scanning means. When the scanning mirror 13 is reciprocatingly oscillated by the above reciprocating swinging, the laser light incident from the deflection mirror 12 is reflected from the plane mirror 13b, is formed as scanning laser light, and is emitted toward a bar code.

The detection unit 7 includes: the scanning mirror 13; the PD field diaphragm 5b; a band-pass filter 8; and a photo-detector (PD) 16 as light receiving means.

The emitted scanning laser light is reflected from the bar code surface, and impinges on the scanning mirror 13 again as return light. By the scanning mirror 13, the return light is condensed by the concave mirror 13a, and is reflected toward the photo-detector 16. The PD field diaphragm 5b arranged just before the photo-detector 16 passes only the return light, and cuts turbulence light incident from directions excluding a direction from the concave mirror 13a. After the return light passes the PD field diaphragm 5b, only the return light with approximately a desired wavelength transmits through the band-pass filter 8, and is received by the photo-detector 16.

A control portion 17 which is installed on the substrate unit 2b and includes an electronic circuit substrate performs driving and signal processing for units and components. The control portion 17 controls the light source unit 3 and the scanning unit 6, converts an analog signal obtained from the detection unit 7 into a binary signal corresponding to black and white information of the bar code for output to an external equipment (information processing).

In FIG. 1B, the wall portion of the chassis is represented by the dotted lines, and double broken lines indicate the emission optical path, and broken lines indicate the return optical path of the laser light. When components are arranged in a plane, the light source unit 3 such as the light source and the deflection mirror intercepts the optical path for the return light, and the detection unit 6 intercepts the optical path for the emitted light as seen from FIG. 1B, because light basically returns, tracing the same optical path as the emission optical axis. Generally, there has been adopted an optical path distributor such as a prism in order to prevent the above problem. In the present embodiment, the plane of the emission optical axis and that of the return optical axis are offset from each other in the height direction with regard to the installing surface of the chassis. That is, the above problem is solved without adding the optical path distributor and the like, by hierarchically arranging the light source unit 3 (emission element) and the detection unit 6 (photoelectric conversion element). Here, the emission element implies the collimator lens 11, the deflection mirror 12, and the LD emission diaphragm 5a, and the photoelectric conversion element implies the PD field diaphragm 5b, the band-pass filter 8, and the photo-detector (PD) 16. As the above members are hierarchically arranged, there may be realized an advantage that the installing area is reduced without increasing the area. Moreover, it is acceptable to adopt not the element according to the embodiment, but a well-known unit as the scanning unit.

The return light of the laser light according to the present embodiment is reflected from the bar code surface, impinges on the concave mirror 13a of the scanning mirror 13 for condensing, and is deflected toward the photo-detector 16. The deflected return light passes through the PD field diaphragm 5b to remove turbulence light, and transmits through the band-pass filter 8. Thereafter, only the return light with a predetermined wavelength is led to the photo-detector 16.

According to the above configuration, turbulence light from directions excluding an expectable incident range may be intercepted by the PD field diaphragm, because the return light traces the same optical path as that of the emitted light. Furthermore, the band-pass filter 8 may improve the signal-to-noise ratio of the input to a signal processing circuit because light with a wavelength different from that of the laser light irradiated by the light source unit 3, that is, noise components, is intercepted.

The features of the present embodiment will be explained.

In the present embodiment, the light source unit 3 and the detection unit 6 are hierarchically arranged as described above. In the above arrangement, the diaphragm portion 5 is provided at the front of the collimator lens 11 and the band-pass filter 8.

This diaphragm portion 5 includes one piece of a plate-like member, and the LD emission diaphragm 5a is formed in the lower portion of the plate-like member as one diaphragm (through hole), and the PD field diaphragm 5b is also formed in the upper portion of the plate-like member as one diaphragm (through hole). The hole shapes and the areas of these diaphragm 5a and 5b are decided according to design specifications as suitable. In the present embodiment, the hole of the LD emission diaphragm 5a has a rectangular shape as shown in FIG. 1C, and is formed in such a way that the laser light has a desired spot size. Moreover, the size of the PD field diaphragm 5b is decided by a spot size of condensed light through the concave mirror 13a. Obviously, setting conditions are not limited to the above ones, and may be changed as needed.

The above diaphragm portion 5 includes the LD emission diaphragm 5a and the PD field diaphragm 5b as one body, and the diaphragm 5a is provided at a lower location, and the diaphragm 5b is provided at an upper location with regard to the installing surface of the chassis member 2a. The LD emission diaphragm 5a and the PD field diaphragm 5b are arranged offset from each other in a direction perpendicular to the scanning plane, and are aligned and arranged along the same vertical axis. Here, there is not provided an adjustment mechanism.

One of the main causes of an angle error of the emission optical axis is a relative position error between the light emission point of the laser diode 9, and the collimator lens 11 and the LD emission diaphragm 5a, and an angle error Δθ is represented by the following formula (1):

$$\Delta\theta = A \, \text{TAN}(\Delta x/L) \tag{1}$$

Here, Δx is a perpendicular component of a relative position deviation between the light emission point, and the collimator lens 11 and the LD emission diaphragm 5a, wherein the perpendicular component is perpendicular to the optical axis, and L (L1+L2 in FIG. 2) is a distance in the direction of the optical axis between the light emission point, and the collimator lens 11 and the LD emission diaphragm 5a.

FIG. 2 is a schematic view explaining the features of the present embodiment according to the same manner as that of conventional technologies. Though the collimator lens 11 and the LD emission diaphragm 5a have been placed adjacent to the laser diode 9 so far, the deflection mirror 12 is arranged between the laser diode 9, and the collimator lens 11 and the LD emission diaphragm 5a in the present embodiment. Therefore, the distance L in the formula (1) becomes longer than a conventional one by a configuration in which a lens with a longer focal distance is adopted as the collimator lens 11, and the collimator lens 11 and the LD emission diaphragm 5a are separated from the laser diode 9. Thereby, an angle variation Δθ of the emission optical axis may be reduced, the variations being caused by relative position errors between the laser diode 9, and the collimator lens 11 and the LD emission diaphragm 5a. Accordingly, the emission optical axis may be directed to the front surface according to the design with a principally good accuracy even if there is performed no fine adjustment of the emission optical axis at manufacturing.

Furthermore, the LD emission diaphragm 5a and the PD field diaphragm 5b are formed to one member as one body in the present embodiment. Thereby, the relative position error between the LD emission diaphragm 5a and the PD field diaphragm 5b may be reduced to a minimum. When the LD emission diaphragm 5a and the PD field diaphragm 5b have the relative position error, the size of the PD field diaphragm 5b is required to be set larger than the spot diameter of condensed light considering the above error, because the emission optical axis and the return optical axis follow the same optical path. However, the relative position error is reduced to a minimum in the present embodiment, and thus the area (diameter) of the PD field diaphragm 5b may be made smallest to efficiently control incidence of turbulence light.

In the present embodiment, the LD emission diaphragm 5a and the PD field diaphragm 5b are arranged offset from each other in a direction perpendicular to the scanning plane. Thereby, the LD emission diaphragm 5a and the PD field diaphragm 5b can be aligned and arranged along the same vertical axis. Therefore, the above holes may be opened by one mold having the same working standard surface at actual component working, using molding or pressing as a working method. Accordingly, the relative position error between the LD emission diaphragm 5a and the PD field diaphragm 5b may be reduced further to a minimum.

Subsequently, modified examples of the present embodiment will be explained.

Figure 3:
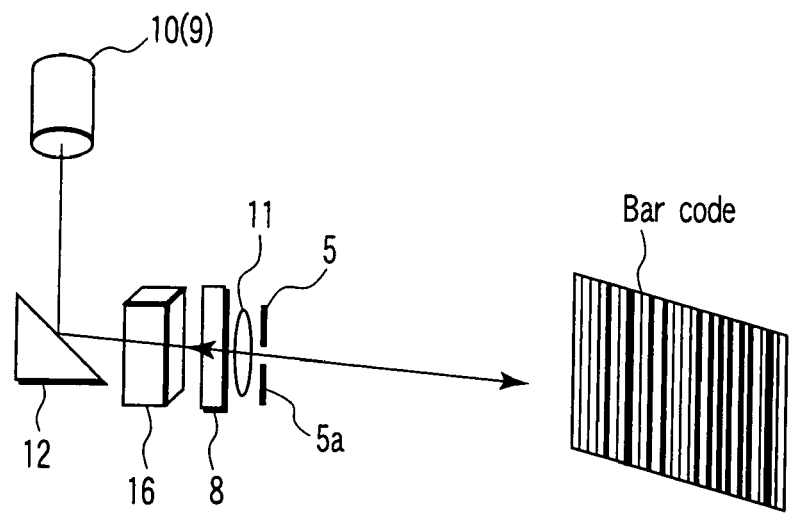
FIG. 3 is a schematic view showing a configuration example according to a first modified example.

FIG. 3 is a schematic view showing a configuration example, as a first modified example, in which a light receiving surface of a photo-detector 16 is arranged at the position of a PD field diaphragm 5b.

In the above modified example, the light receiving surfaces of an LD emission diaphragm 5a and the photo-detector 16 are aligned and arranged along the same perpendicular direction as one body. Thereby, a lens member of a not shown light condensing system, which is provided just before the light receiving surface of the photo-detector 16, and the size of the light receiving surface itself perform the function of the PD field diaphragm. Accordingly, the present modified example, in a similar manner to that of the first embodiment, obtains an advantage that there is a small error between an emission optical axis and the light receiving surface (return optical axis).

Figure 4:
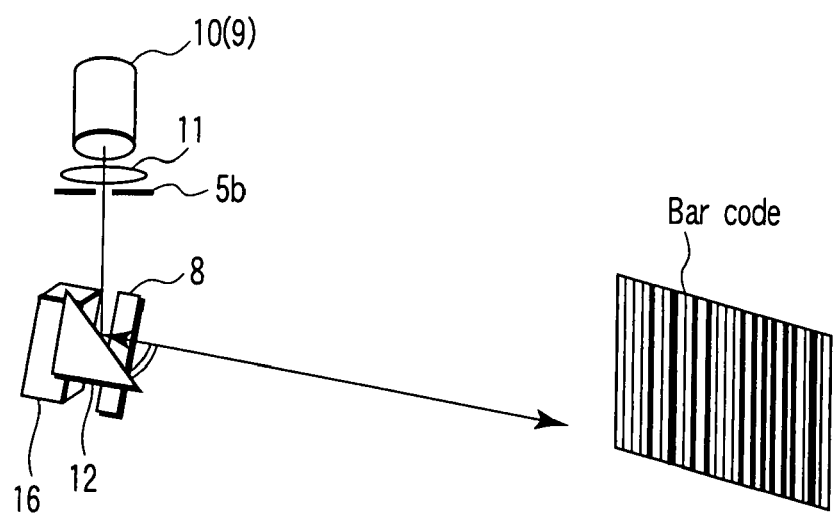
FIG. 4 is a schematic view showing a configuration example according to a second modified example.

FIG. 4 is a schematic view showing a configuration example, as a second modified example, in which an LD emission diaphragm is arranged adjacent to a light source in a similar manner to that of a conventional one, and a deflection mirror and a PD light receiving portion are arranged as one body.

In the above second modified example, an LD emission diaphragm 5*a* is arranged in the vicinity of a laser diode 9, and a photo-detector 16 and a band-pass filter 8 are aligned and arranged along the same direction perpendicular to a deflection mirror 12 as one body.

Even in the case where there is caused an angle deviation of an emission optical axis by an error of the deflection mirror 12 in the rotation direction, there is caused an error, in a similar rotation direction, of the light receiving surface of the photo-detector 16 arranged with the deflection mirror 12 as one body according to the above configuration. Thereby, changes in the angle of incidence to the band-pass filter 8 may be reduced to a minimum, and the transmission wavelength width of the band-pass filter 8 may be designed to be narrower.

According to the present embodiment, there may be provided a bar code scanner in which an optical axis accuracy is improved at low-cost and reading performance is improved.

Figure 5A:
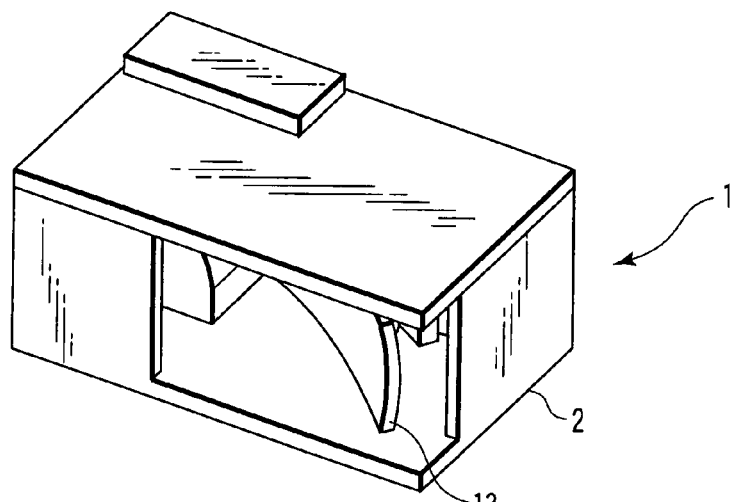
FIG. 5A is a perspective and general view showing an external appearance of a bar code reader according to a second embodiment.
Figure 5B:
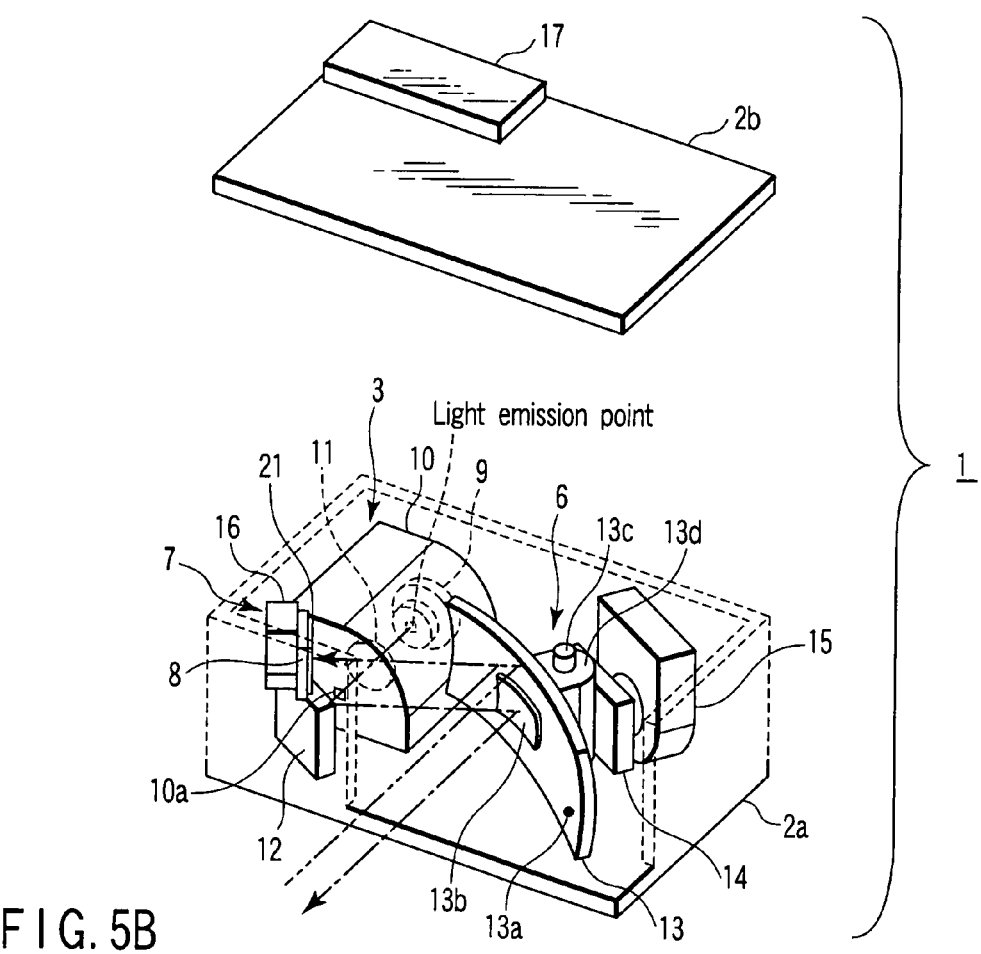
FIG. 5B is a perspective view of an internal configuration, wherein the side wall portion is represented by dotted lines.
Figure 5C:
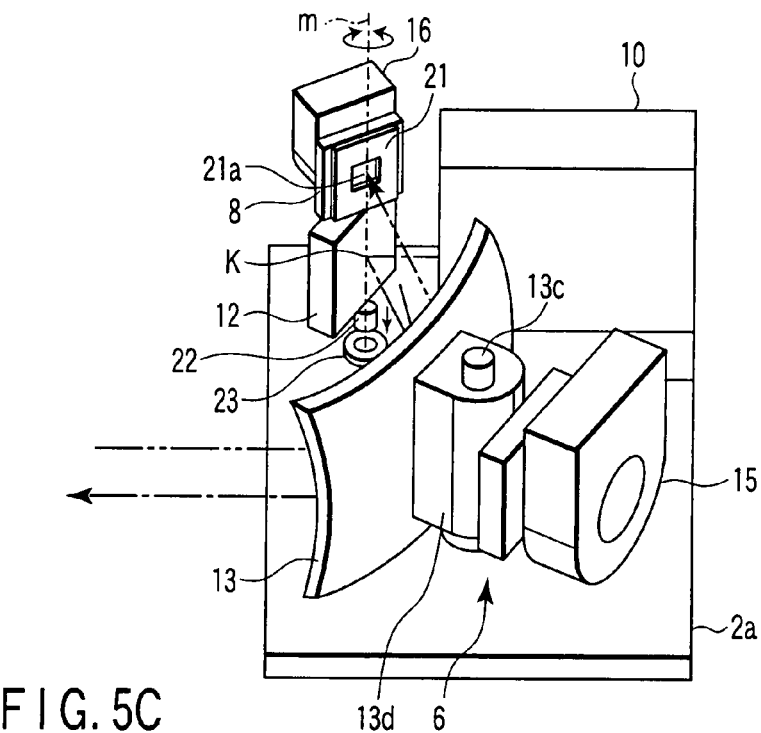
FIG. 5C is a perspective view showing the internal configuration seen from the back side, wherein an exterior member (wall portion) is removed.

Subsequently, a second embodiment will be explained referring to the drawings. FIG. 5A is a perspective and general view showing an external appearance of a bar code reader according to the second embodiment, FIG. 5B is a perspective view of an internal configuration, wherein a side wall portion is represented by dotted lines, and FIG. 5C is a perspective view showing the internal configuration seen from the back side, wherein the side wall portion is removed. The bar code reader which has been actually made has a rectangular parallelepiped shape with an external dimension of, for example, about 21 mm in width, about 14 mm in depth, and about 11 mm in height. Here, components similar to those of the above-described first embodiment will be denoted by the same reference numerals in the present embodiment, and the description thereof will be omitted.

A bar code reader 1 shown in FIG. 5A has a housing 2 as an exterior member. The housing 2 includes: a chassis member 2*a* as a fixed base; and a substrate unit 2*b* to become the above lid.

The chassis member 2*a* supports units and members, which will be described later, as one body, and has a set-up surface for external devices on a not-shown undersurface. The above chassis member 2*a* is formed of a metallic material, such as aluminum, having enough strength resisting impacts such as drop impacts. Furthermore, it is acceptable to use alloy metal or hard resin. Mainly, a light source unit 3, a deflection mirror 12, a light receiving diaphragm portion 21, a scanning unit 6, and a detection unit 7 are installed on the chassis member 2*a*.

A control circuit, a signal processing circuit, and the like, which perform driving and signal processing for the after-described units and the after-described members, are installed on the substrate unit 2*b*.

The light source unit 3 includes: a laser diode (LD) 9 emitting laser light as light source means; a collimator lens 11 collimating the laser light; an accommodation portion 10 accommodating the LD 9 and the collimator lens 11; and a deflection mirror 12 as deflecting means for directing the laser light toward the scanning unit 6 through deflection by reflection.

In the present embodiment, the deflection mirror 12, the light receiving diaphragm portion 21, and the detection unit 7 are separately made, and fixed as one body as shown in FIG. 5C.

In the accommodation portion 10, there is formed an LD emission diaphragm 10*a* by which the light flux cross section of the laser light, which is irradiated from the laser diode 9 and is collimated by the collimator lens 11, is focused to a desired spot size. There may be obtained a light source, which is extremely cheap and has high visibility, by a configuration in which the laser diode 9 has a specification of an external diameter of 5.6 mm, and a wavelength of 650 nm, the specification being widely adopted for, for example, a DVD player.

By the above configuration, the laser light irradiated from the laser diode 9 is collimated by the collimator lens 11, passes through the LD emission diaphragm 10*a* to be formed to have the desired spot size, and is emitted to the scanning unit 6 after reflection on the deflection mirror 12.

The scanning unit 6 includes: a plane mirror 13*b* formed on the scanning mirror 13; a magnet 14 mounted on a supporting member 13*d* which rotatably supports a rotating shaft 13*c* provided on the back side of the scanning mirror 13; and a coil 15 which reciprocatingly swings to the magnet 14 by electromagnetic force.

A concave mirror 13*a*, and the plane mirror 13*b* as the scanning means integrally formed in the nearly center portion of the mirror 13*a* are formed on the scanning mirror 13.

In the scanning unit 6, the scanning mirror 13 reciprocatingly swings by the electromagnetic force generated between the magnet 14 and the coil 15. Then, laser light deflected by the deflection mirror 12 is reflected by the plane mirror 13*b* which reciprocatingly swings, is formed as scanning laser light, and is emitted toward a bar code. The detection unit 7 includes: the concave mirror 13*a* as light condensing means formed on the scanning mirror 13; the light receiving diaphragm portion 21 in which a PD field diaphragm 21*a* as light-receiving range decision means is formed; a band-pass filter 8; and a photo-detector (PD) 16.

A control portion included in an electronic circuit mounted on the substrate unit 2*b* performs driving and signal processing for the above units and members. The control portion controls the light source unit 3 and the scanning unit 6, and converts an analog signal obtained from the detection unit 7 into a binary signal corresponding to black and white information of the bar code for output to an external equipment (information processing) through a connector 17.

In FIG. 5B, the wall portion of the chassis is represented by dotted lines, and alternate long and short dashed lines indicate the emission optical path, and chain double-dashed lines indicate the return optical path of the laser light. The emitted scanning laser light is reflected from the not-shown bar code surface, and impinges on the concave mirror 13*a* on the scanning mirror 13 as return light. The return light is condensed by the concave mirror side 13*a*, and is irradiated toward the photo-detector 16. The PD field diaphragm 21*a* arranged just before the photo-detector 16 passes only the return light, and cuts turbulence light incident from directions excluding a direction from the concave mirror 13*a*. After the return light passes the PD field diaphragm 21*a*, only the return light with approximately a desired wavelength transmits through the band-pass filter 8, and is received by the photo-detector 16.

For example, when components are arranged in a plane, the light source unit 3 intercepts the optical path for the return light, and the detection unit 6 intercepts the optical path for the emitted light as seen from FIGS. 5B and 5C, because light returns tracing the same optical path as the emission optical axis. Generally, there has been adopted an optical path distributor such as a prism in order to prevent the above problem.

In the present embodiment, the plane of the emission optical axis and that of the return optical axis are offset from each other in the height direction with regard to the installing surface of the chassis. That is, the above problem is solved without adding the optical path distributor and the like by hierarchically arranging the light source unit 3 (emission element) and the detection unit 6 (photoelectric conversion element). Here, the emission element implies the collimator lens 11, the deflection mirror 12, and the LD emission diaphragm 10a, and the photoelectric conversion element implies the PD field diaphragm 21a, the band-pass filter 8, and the photo-detector (PD) 16. As the above members are hierarchically arranged, there may be realized an advantage that the installing area is reduced without increasing the area. Moreover, it is acceptable to adopt not the element according to the embodiment, but a well-known unit as the scanning unit.

The return light of the laser light according to the present embodiment is reflected from the bar code surface, impinges on the concave mirror 13a of the scanning mirror for condensing, and is deflected toward the photo-detector 16. The deflected return light passes through the PD field diaphragm 21a to remove turbulence light, and transmits through the band-pass filter 8. Thereafter, only the return light with a predetermined wavelength is led to the photo-detector 16.

According to the above configuration, turbulence light from directions excluding an expectable incident range may be intercepted by the PD field diaphragm 21a, because the return light traces the same optical path as that of the emitted light. Furthermore, the band-pass filter 8 may improve a signal-to-noise ratio of a signal input to a signal processing circuit because light with a wavelength different from that of the laser light irradiated by the light source unit 3, that is, noise components are intercepted.

In the present embodiment, a rotation adjusting shaft 22 for adjusting the deflection direction of the deflection mirror 12 is provided on the bottom center of the deflection mirror 12. The above rotation adjusting shaft 22 has an axis m as a rotation center axis, the axis m being parallel to a direction perpendicular to the scanning plane (plane including the scanning directions of laser scanning light emitted from the scanning mirror 13 toward the bar code). A shaft receiving hole 23, which rotatably engages with the rotation adjusting shaft 22, is provided on the chassis member 2a. Moreover, the detection unit 7 (the light receiving diaphragm portion 21, the band-pass filter 8, and the photo-detector 16) is fastened on the deflection mirror 12. Here, the deflection mirror 12 and the light receiving diaphragm portion 21 are arranged along a direction (the direction of the axis m) perpendicular to the scanning plane as shown in FIG. 5C. Furthermore, an ideal reflection point K on the reflecting surface 12a of the deflection mirror 12 and the PD field diaphragm 21a are arranged to coincide with each other on the axis m, and the rotation center of the deflection mirror 12 with respect to the chassis member 2a is also arranged to coincide with the axis m.

Figure 7A:
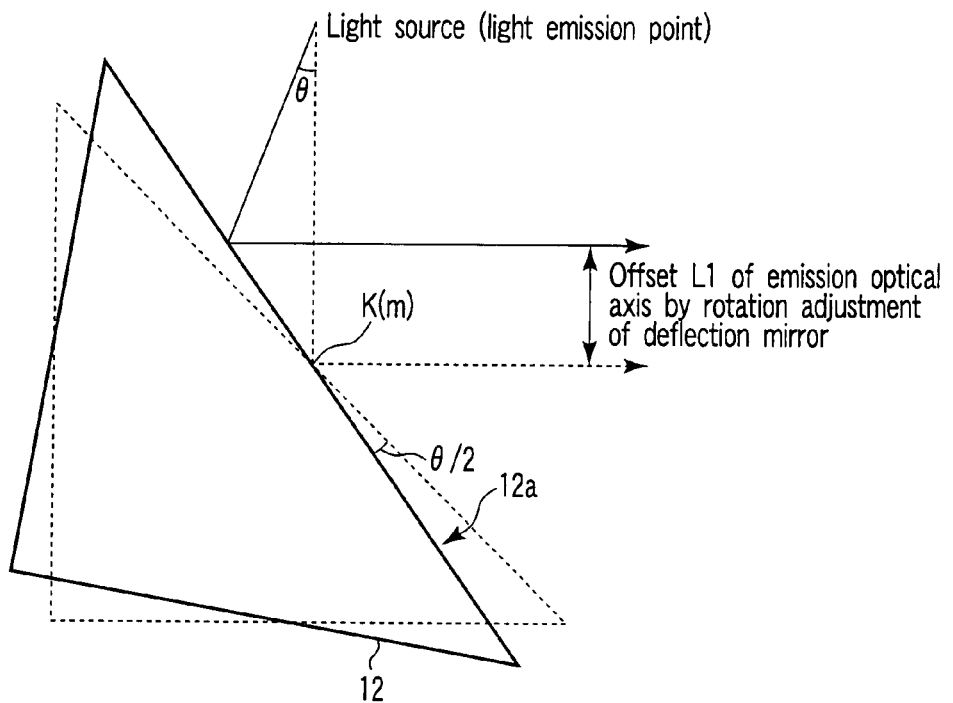
FIG. 7A is a view explaining an offset of an emission optical axis by rotation adjustment in a case in which a rotation axis is on a deflection mirror surface.

FIG. 7A is a view explaining an offset of the emission optical axis by rotation adjustment of the deflection mirror 12 in order to understand the feature of the present embodiment. Here, the deflection mirror 12 is arranged such that the rotation-adjusting center axis m of the rotation adjusting shaft 22 of the deflection mirror 12 and the ideal reflection point K on the reflecting surface 12a of the deflection mirror 12 coincide with each other. The ideal arrangement of the deflection mirror 12 and the emission optical path are represented by dotted lines. On the other hand, there is represented by solid lines a case in which the emission optical axis is corrected by rotating the deflection mirror only by θ/2 because light emitted from the light source has an error of an angle θ. In the above arrangement, the offset L1 of the emission optical axis by rotation adjustment is a shift from the optical path represented by the dotted line to the optical path represented by the solid line.

Figure 7B:
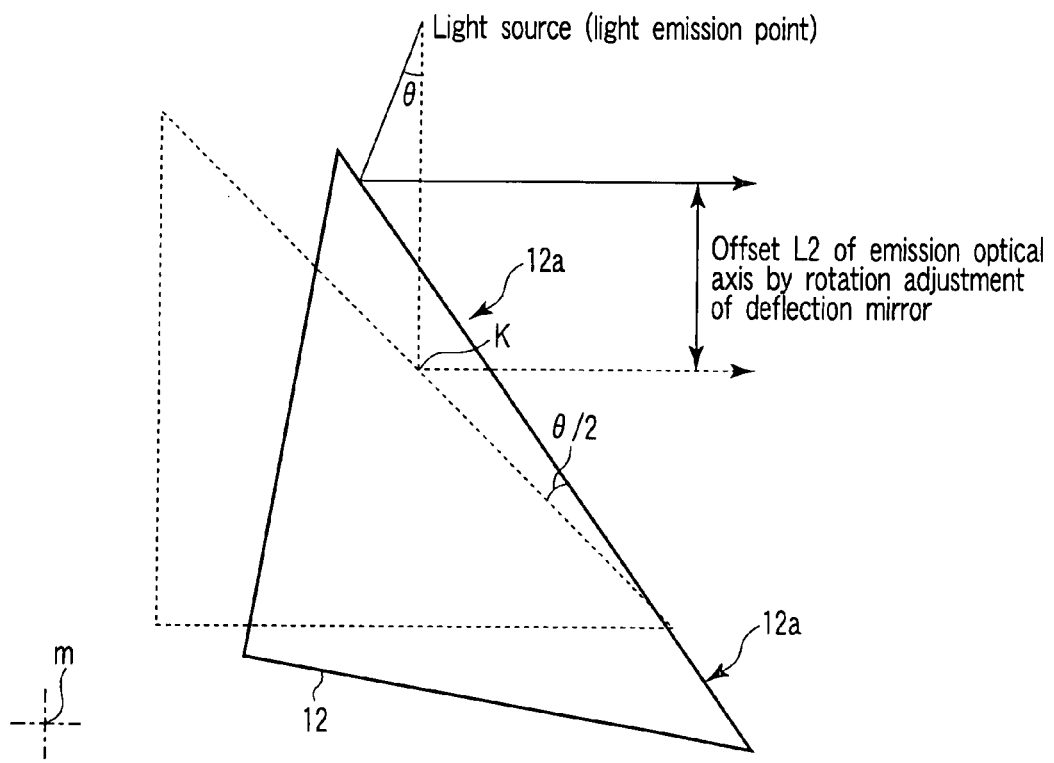
FIG. 7B is a view explaining an offset of the emission optical axis by rotation adjustment in a case in which the rotation axis is behind the deflection mirror surface.

On the other hand, FIG. 7B is a view showing an offset L2 of the emission optical axis by rotation adjustment of the deflection mirror 12 when the rotation-adjusting center axis m of the deflection mirror 12 is located behind the ideal reflection point K of the deflection mirror 12. When the rotation-adjusting center axis m is separated from the ideal reflection point K, the above offset L2 is larger than the offset L1 obtained when the rotation-adjusting center axis m and the ideal reflection point K coincide with each other. As seen from the above, when the rotation-adjusting center axis m is set such that the ideal reflection point K of the deflection mirror 12 and the rotation-adjusting center axis m coincide with each other, the offset of the emission optical axis by rotation adjustment of the deflection mirror 12 may be effectively controlled. When there is generated a large offset between an actual return optical axis and an ideal return optical axis, depending on variations of optical components and on adjustment of the emission optical axis, the size of the PD field diaphragm 21a has been conventionally required to be set larger than the spot diameter of condensed light, considering the above offset. On the other hand, the offset of the return optical axis is reduced to a minimum in the present embodiment, and thus the diameter of the PD field diaphragm 21a may be made smallest to efficiently control incidence of turbulence light. Moreover, a configuration, in which the deflection mirror 12 and the light receiving diaphragm portion 21 are arranged along a vertical axis, more contributes to the downsizing in the height direction of the product, in comparison with a configuration in which the laser diode 9 and the photodetector 16 are aligned and arranged along the same vertical axis.

Moreover, a similar advantage may be obtained even when the PD field diaphragm 21a is replaced with the light receiving surface of the photo-detector 16 as a first modified example of the present embodiment.

Subsequently, a third embodiment will be explained.

Figure 6:
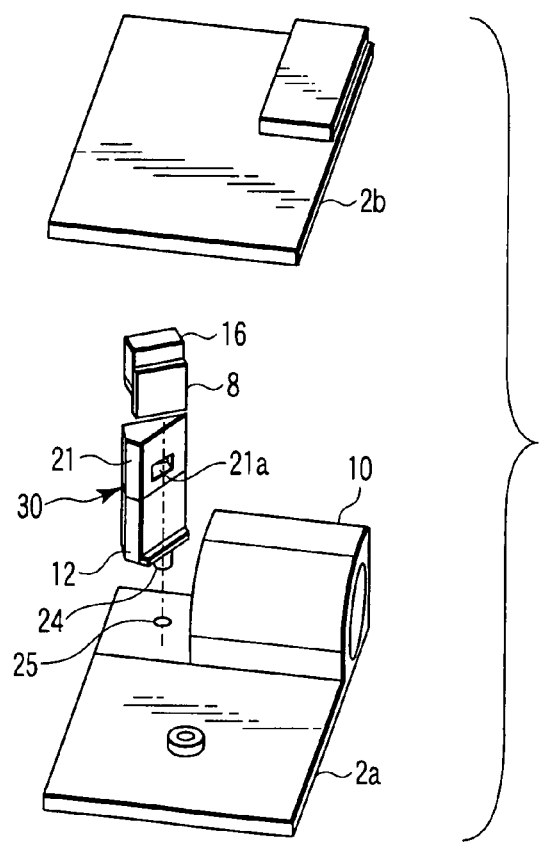
FIG. 6 is an exploded perspective view showing an internal configuration, seen from the back side, of a bar code reader according to a third embodiment wherein the side wall portion is removed.

FIG. 6 is an exploded perspective view showing an internal configuration, seen from the back side, of a bar code reader according to the third embodiment wherein the side wall portion is removed. Here, description of a scanning unit will be omitted because the unit is not a main point of the invention, but the unit is actually equipped. Here, components similar to those of the above-described first embodiment will be denoted by the same reference numerals in the present embodiment, and the description thereof will be omitted.

In the present embodiment, a deflection mirror 12 and a PD field diaphragm 21 are molded to one opaque molded component as one body. Reflection coating of gold evaporation and the like is applied on a reflecting surface 12a of the deflection mirror 12. Moreover, it is acceptable to place a glass mirror of another form over the reflecting surface in order to form the reflecting surface. A band-pass filter 8 is fastened behind the PD field diaphragm, and the band-pass filter 8 and the PD field diaphragm function as one body.

A rotation adjusting axis 31 deciding a rotation adjusting center is provided on the undersurface of an integrated deflection mirror and field diaphragm member 30. Moreover, a hole 31a which engages the rotation adjusting axis 31 is provided on the chassis member 2a, and adjustment may be performed at manufacturing by rotating the integrated deflection mirror and field diaphragm member 30 on the chassis member 2a. After completing the above emission optical axis adjustment, the integrated deflection mirror and field diaphragm member 30 is permanently fastened to the chassis member 2a, using an adhesive material. Here, it is acceptable to use screws as fastening means.

Figure 8:
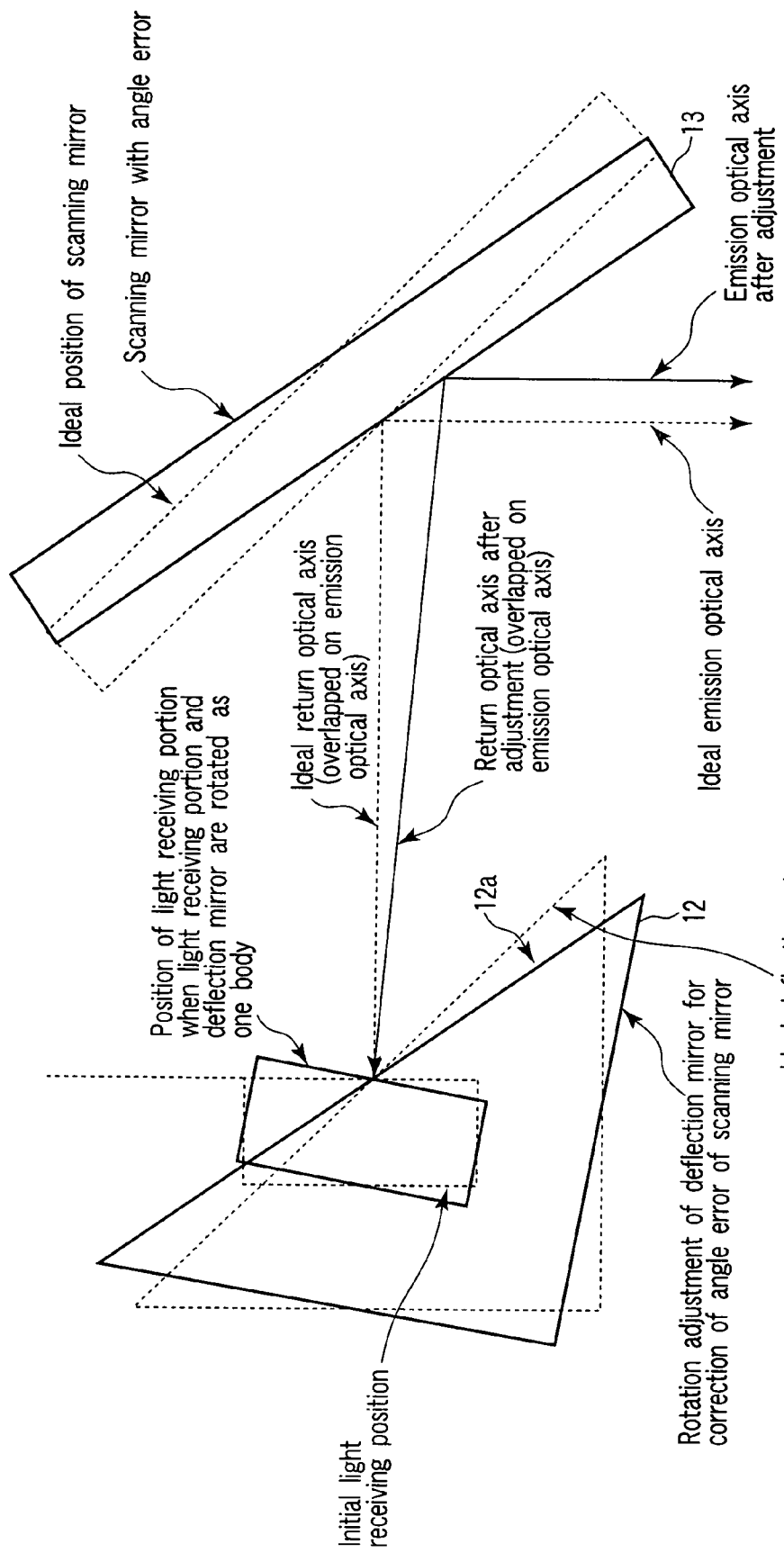
FIG. 8 is a schematic view explaining changes in an angle of incidence of return light to a light receiving portion by rotation adjustment of the deflection mirror according to the third embodiment.

FIG. 8 is a schematic view explaining changes in the angle of incidence of return light to a light receiving portion in order to understand the feature of the present embodiment, wherein the changes are generated when an error of the emission optical axis caused by an error of a scanning mirror is corrected by rotation adjustment of the deflection mirror. An arrangement of the ideal deflection mirror, scanning mirror, and light receiving portion (the light receiving diaphragm 21, the band-pass filter 8, a photo-detector 16), and an emission optical path are represented by dotted lines. On the other hand, there is represented by solid lines a case in which the emission optical axis is corrected by rotating an integrated deflection mirror and light receiving portion member because the scanning mirror has an angle error. Here, it is assumed for convenience of explanation that, in the scanning mirror, a concave mirror surface is assumed to be a plane, and a plane mirror surface and the concave mirror surface are formed on the same plane.

As shown by the optical path represented by the solid line, there is caused changes in the angles of incidence to the light receiving portion of the return light as a side effect when an angle deviation of the emission optical axis by an error in the rotation direction of the scanning mirror is corrected by rotating the deflection mirror 12. However, there is hardly caused the changes in the angles of incidence to the light receiving portion of the return light because the light receiving portion and the deflection mirror 12 are formed as one body, and the light receiving portion is rotated only by a rotation equal to that of the deflection mirror 12 in the present embodiment. Accordingly, there may be controlled variations of the angles of incidence of the return light to the band-pass filter 8 arranged just before the photo-detector 16, and the transmission wavelength width of the band-pass filter may be designed to be narrower. As a result, the greatest advantage of an original band-pass filter may be obtained, in which light with an unnecessary wavelength is cut to improve the signal-to-noise ratio. Moreover, a configuration, in which the deflection mirror 12 and the light receiving portion are formed as one body, may make an adjusting movable sub-assembly smaller, and more contributes to a smaller size of the whole product in comparison with a configuration in which the laser diode and the photo diode are formed as one body. As described above, the present embodiment may have an advantage, in addition to the advantage of the above-described first embodiment, that axis adjustment becomes extremely easy by molding the deflection mirror 12 and the light receiving diaphragm portion 21 (PD field diaphragm 21a) as one molding member, thereby realizing the smaller size of the movable sub-assembly as an adjusting unit.

Subsequently, a fourth embodiment will be explained.

Figure 9:
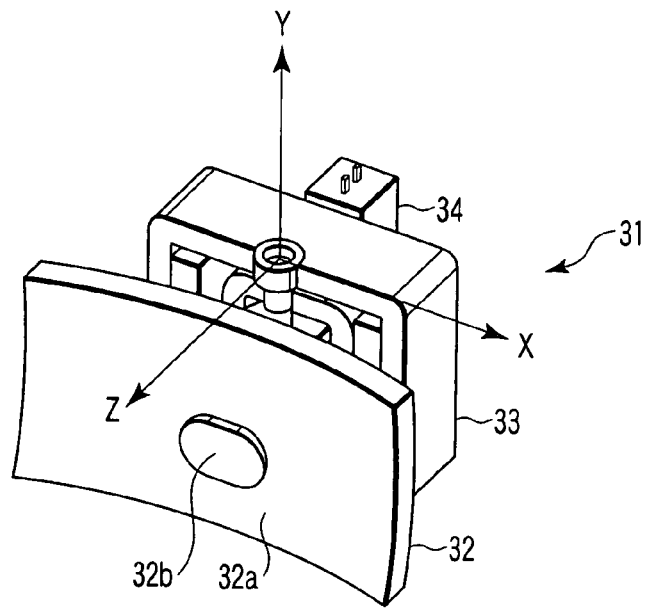
FIG. 9 is a perspective view showing an external appearance of a scanning unit with which a bar code reader according to a fourth embodiment is equipped.
Figure 10:
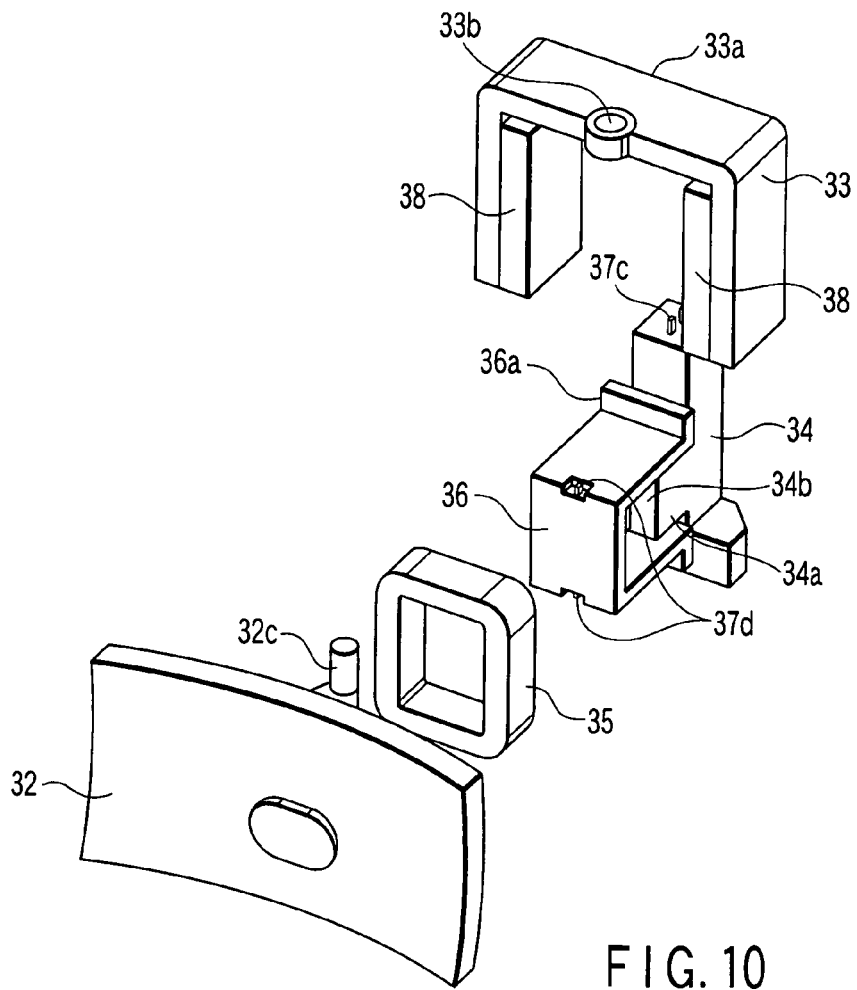
FIG. 10 is an exploded perspective view showing the scanning unit according to the fourth embodiment.

FIG. 9 is a perspective view showing an external appearance of a scanning unit with which a bar code reader according to the present embodiment is equipped, wherein the scanning unit uses a galvanomirror, and FIG. 10 is an exploded perspective view showing the scanning unit.

The scanning unit 31 is equipped in a chassis member 2a, and a scanning mirror 32 is provided in the scanning unit 31, wherein the mirror 32 reciprocatingly swings at a desired frequency by electromagnetic driving. According to the reciprocatingly swinging of the scanning mirror 32, a flat mirror surface 32b provided in the nearly center portion of the scanning mirror 32 horizontally swings in the right and left direction. Laser light emitted from a not-shown light source unit impinges on the flat mirror surface 32b, and is reflected by the surface 32b. By the configuration in which the laser light is reflected by the flat mirror surface 32b which reciprocatingly swings, the laser light is emitted as scanning laser light to the outside wherein the scanning laser light scans within a range of the swinging angle of the flat mirror surface 32b. The scanning laser light emitted to the outside is irradiated across a bar code, is reflected from the bar code surface, and impinges on a concave mirror surface 32a of the scanning mirror 32 as return light. The above return light is condensed by the concave mirror surface 32a as described above, passes through a PD field diaphragm, transmits through a band-pass filter, and impinges on a photo-detector to generate a detection signal by photoelectric conversion.

In the above scanning unit 31, a fastened-end holding member 34 provided with a rectangular protruding portion 34a is fastened to the chassis member 2a (refer to FIG. 5C). As shown in FIG. 10, a U-shaped movable-end holding member 36 is linked to the fastened-end holding member 34 through supporting springs 37 in such a way that the holding member 36 inserts the protruding portion 34a on the upper and lower surfaces through a gap. The tip surface 34b of the protruding portion 34a and a U-shaped bottom surface 36a of the movable-end holding member 36 are linked to each other through the supporting spring 3 as described later. Moreover, the scanning mirror 32 is fastened to a tip of the movable-end holding member 36. A driving coil 35 with a rectangular frame shape fits into the periphery of the movable-end holding member 36.

On the other hand, a U-shaped yoke 33 is also fastened to the chassis member 2a, a magnet 38 is mounted on each of both the sides of the yoke 33, and a magnetic circuit having a one-direction magnetic field is formed in a space therebetween. The driving coil 35 of the above-described scanning unit 31 is arranged to be inserted into the above space with a gap apart. A displacement-regulating shaft-receiving hole 33b is formed in the center of a yoke link portion 33a, and a rotating shaft 32c is fitted into the hole 33b with a gap, the rotating shaft 32c being provided in the back side (in the back side of the concave mirror surface 32a) of the scanning mirror 32.

Here, the scanning mirror 32, the driving coil 35, and the movable-end holding member 36 form a movable portion swinging as one body in the scanning unit 31 according to the present embodiment.

Hereinafter, each of the components in the scanning unit 31 will be explained in detail.

Figure 11:
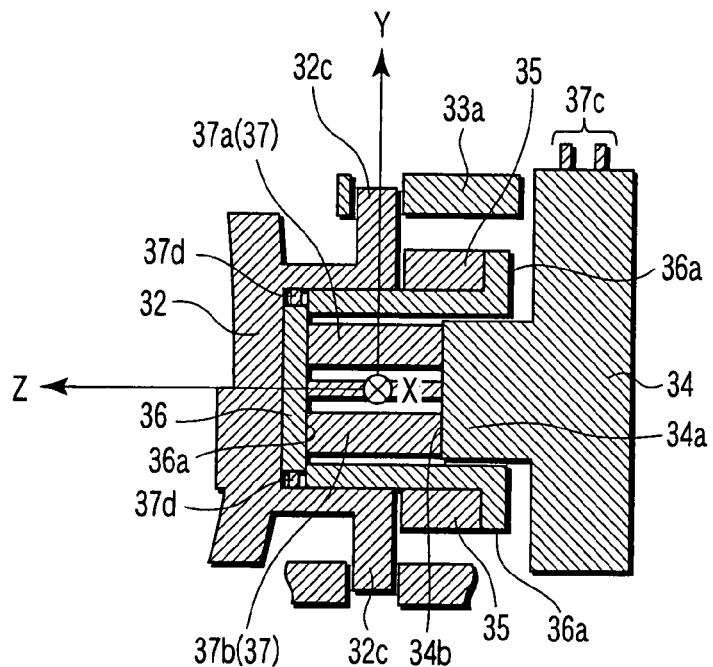
FIG. 11 is a horizontal cross-sectional view of the scanning unit according to the fourth embodiment.
Figure 12:
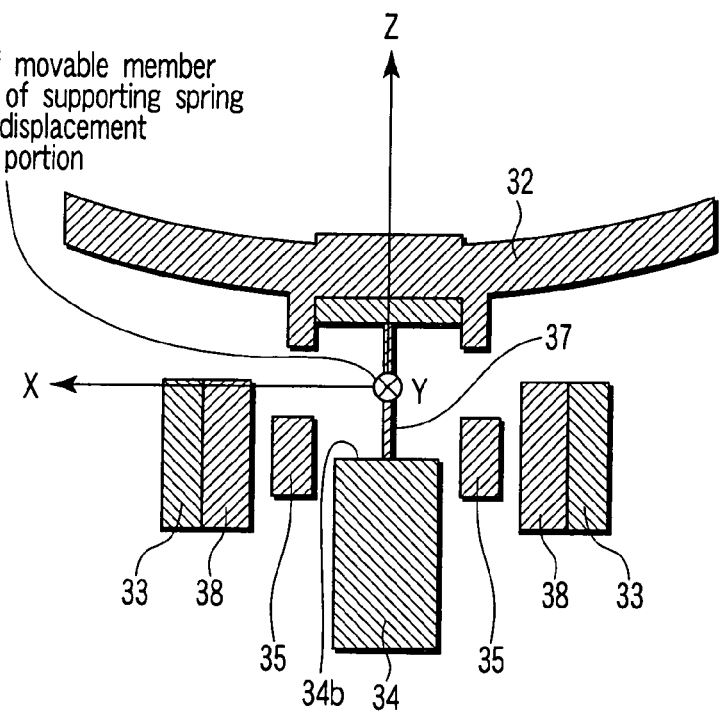
FIG. 12 is a vertical cross-sectional view of the scanning unit according to the fourth embodiment.
Figure 13:
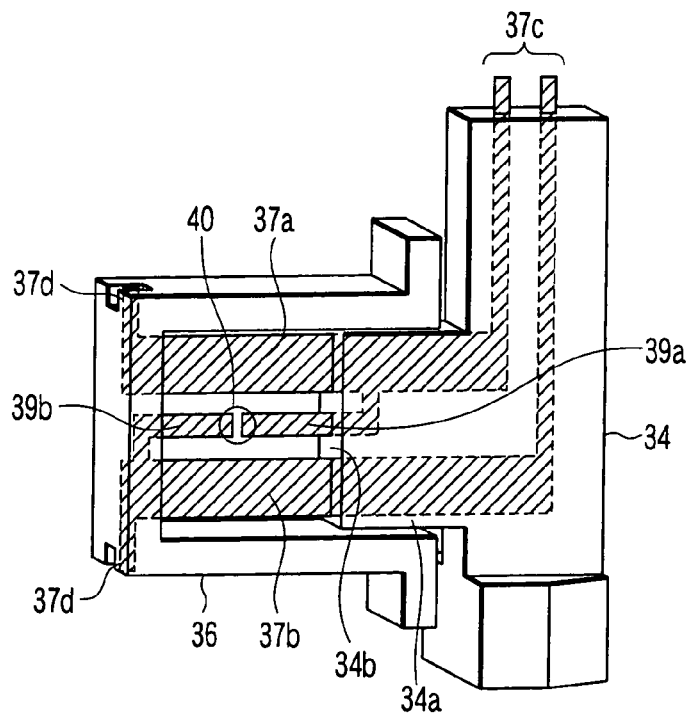
FIG. 13 is a view showing a configuration of a supporting spring according to the fourth embodiment.

FIG. 11 is a horizontal cross-sectional view of the scanning unit 31, FIG. 12 is a vertical cross-sectional view of the scanning unit 31, and FIG. 13 is a view showing a configuration of the supporting springs 37 linking the movable-end holding member 36 to the fastened-end holding member 34.

As shown in FIG. 11, each of the fastened-end holding member 34 and the movable-end holding member 36 is supported by ends of the two metallic plate springs (37a, 37b) forming the supporting spring 37. Actually, insert molding of the above components is performed as one body in such a way that the supporting springs are suspended between both the holding members 34 and 36. The supporting spring 37 according to the present embodiment is formed by etching or press working of a thin plate made of beryllium copper for a spring as a metallic material. Accordingly, a feature of the supporting spring 37 is that the spring 37 is excellent in elongation of the material, and in solderability in comparison with other metallic materials such as commonly-used stainless steel.

Liquid crystal polymer (LCP) is used for the fastened-end holding member 34 and the movable-end holding member 36. The LCP, among resin materials for injection molding, is comparatively near to beryllium copper in coefficient of linear expansion, and has enough thermal resistance for soldering, sufficient liquidity for forming a fine structure, and excellent insulating performance. The use of the LCP is appropriate for combination with the material of the supporting spring which also functions as an after-described feeding member (interconnect). As shown in FIGS. 10 and 13, a part of the supporting springs 37 is exposed from the fastened-end holding member and the movable-end holding member as connecting terminals (lead terminals 37c for substrate-unit soldering, and lead terminals 37d for coil-end soldering), wherein the terminals 37c enable electric connection to the substrate unit 2b and the terminals 37d enable electric connection to the driving coil 35.

The supporting springs 37, and the fastened-end holding member 34 and the movable-end holding member 36 according to the present embodiment have a shape by which insert molding may be easily performed by a configuration in which undercuts are removed when the supporting springs 37 formed like a sheet are set in a resin forming mold for insert molding. Moreover, as shown in FIG. 13, there are provided beam portions 39a and 39b between the above supporting springs 37, wherein the beam portions are formed with each of the supporting springs 37 as one body, and the end portions of the beam portions are separated by a predetermined distance. A damper function improving vibration damping is realized by a configuration in which a damper agent 40 with a predetermined viscosity is applied to the above space between the beam portions.

As the supporting springs 37 made of a conductive material also serve as a feeding function to the driving coil 35 in the present embodiment, at least two supporting springs 37a and 37b are provided.

Figure 14:
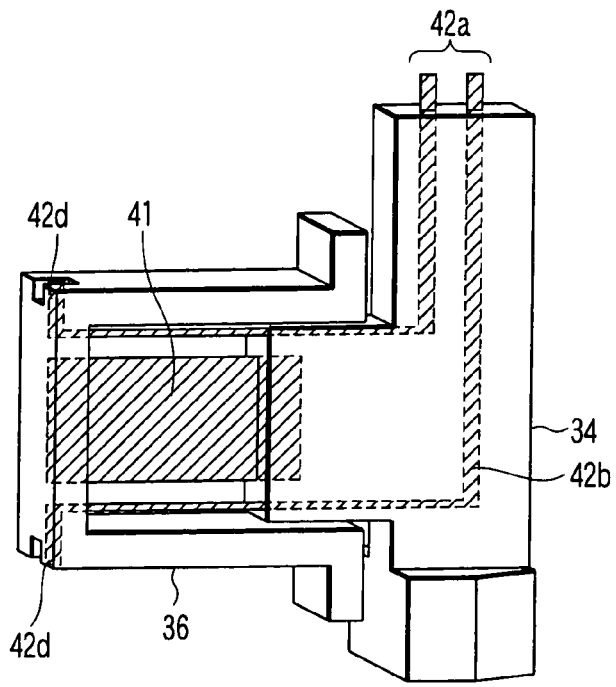
FIG. 14 is a view showing a configuration of a supporting spring according to a modified example of the fourth embodiment.

Here, it is acceptable to adopt a configuration in which, when an interconnect is configured to be provided in a separate manner for feeding to the driving coil 35, there is provided one wide supporting spring 41, and two metallic lines 42a and 42b for electric conduction are arranged in parallel to, and above and below the supporting spring respectively to form the spring and the lines as one body, as shown in FIG. 14 as a modified example. In this case, the rigidity of the metallic lines 42a and 42b for electric conduction is too low to realize a function as a supporting member. Moreover, it is acceptable to adopt a configuration in which the substrate unit 2b and the driving coil 35 are electrically connected to each other at another location completely different from the supporting spring 37, using separate flexible cables and the like. When an interconnect member for feeding to a coil is provided separately from the supporting spring as described above, the supporting spring may not be a conductive material.

The driving coil 35 is inserted in such a way that the frame thereof rests against a brim portion 36a of the movable-end holding member 36 as shown in FIG. 11. The driving coil 35 is formed by winding in a rectangular frame in such a way that fusion magnet wire is inserted into the movable-end holding member 36. Both ends of windings of the driving coil 35 are soldered to the lead terminals 37d, respectively, and a desired driving signal is applied from the substrate unit 2a through the supporting springs 37. A frame portion is formed on the back surface of the scanning mirror 32, and the tip of the movable-end holding member 36 fits into and is fastened to the frame portion.

In the present embodiment, a resin-molded mirror is used as the scanning mirror 32 for the smaller sizes and the lighter weights of movable portions (the scanning mirror 32, the coil 35, and the movable-end holding member 36). Moreover, gold-evaporation coating is applied onto the reflecting surface of the scanning mirror 32 in order to realize high reflectivity. Furthermore, two magnets 38 are arranged to face each other sandwiching the driving coil 35 therebetween, in a direction orthogonal to the center axis of the driving coil 35, and not corresponding to the axial direction of a center axis of a swinging operation of the movable portion, the operation being caused by the deformation of the supporting springs 37. The U-shaped yoke 33 is provided in such a way that the back surfaces of the respective magnets are linked to each other, thereby forming a closed magnetic circuit.

In the scanning unit with the above-described configuration, the whole movable portions swing around the Y axis (horizontal direction) by applying electric current in the driving coil 35 and by generating a force of opposite direction in the Z direction in conducting wire portions of the two sides of the coil across a magnetic gap formed between the two opposing magnets 38, as shown in FIGS. 11 and 12.

Usually, it is most important for a bar code reader to adopt a configuration in which as large a light condensing mirror, or a light condensing lens as possible is arranged to take more return light in, wherein the size of the mirror or lens is almost equal to an aperture area of an scanning aperture opposing to the bar code. Moreover, the capacity of the driving coil 35 can not be sacrificed though a low power-consumption performance is required when the bar code reader is equipped in portable devices. Furthermore, a free length with a predetermined length or longer is required to be secured for the spring portion when a longer life and higher durability are required for a supporting spring portion, wherein repeated loads caused by continuous driving, especially, loads caused by drop impacts are applied to the spring portion, and the drop impacts are important when equipped in a portable device.

Accordingly, by arranging the supporting spring 37 in such a way that the spring passes through the frame of the driving coil 35 in a similar manner to that of the present embodiment, there may be generated a space for installing the supporting spring 37 with a long free length while the space has outer dimensions larger than those of the scanning mirror, and there may be realized a component arrangement by which the capacity of the coil, which is equal to the height of the scanning mirror 32, is secured.

Additionally, the scanning mirror 32 and the driving coil 35 are designed to have approximately the same mass in the present embodiment, and, as illustrated in the horizontal cross section of the scanning unit shown in FIG. 11, both the scanning mirror 32 and the driving coil 35 are connected to the movable side in parallel with each other and with a predetermined distance. Thereby, there is provided a configuration in which, as the barycenter of the movable portions is located approximately at the center of both the mirror 32 and the coil 35, and, furthermore, a rotation center of deformation of the spring when the movable portions are driven, the barycenter and the principal axes of inertia of for the movable portions are arranged to coincide with a same axis by aligning the center position of the free length of the supporting spring 37 over the above barycenter, and thereby the above movable portions are statically and dynamically balanced one another for the above same axis. Furthermore, the same axis design may be easily realized in a statically and dynamically balanced manner by a configuration in which the above-described distance between the scanning mirror and the driving coil and the free length of the supporting spring are set to have almost the same length, the free end of the supporting spring is fastened to the back surface of the scanning mirror, and the fixed end is arranged approximately at the center of the coil.

Additionally, in the present embodiment, the rotating shaft 32c is vertically extended from the scanning mirror 32 at a position coinciding with the above axis, and is rotatably inserted into the displacement-regulating shaft-receiving hole 33b provided on the chassis member 2a and the yoke link portion 33a with a gap.

By the above-described shaft-receiving structure, displacements of the movable portions in the X direction and the Z direction are regulated within a predetermined range of the gap in order to prevent elastic deformation of the supporting springs when drop impacts in the X or Z direction are applied. Furthermore, the above regulating function is realized with the minimum gap by assuming that the shaft-receiving position is a center position of swinging operation with less runout at rotation driving.

It is acceptable to apply a configuration in which the rotating shaft is provided at the scanning mirror, or at the movable-end holding member. Alternatively, it is acceptable to apply a configuration in which another member of another form is mounted on the movable-end holding member. Moreover, though a certain advantage is obtained by a shaft receiving hole 33b provided only at one side of the axis, it is most preferable to apply a configuration, like the structure of the present embodiment, in which a rotating shaft 32c is provided at each of both upper and the lower ends and a shaft-receiving structure is provided at each of the both ends.

In the present embodiment, the width of the magnetic circuit including the coil, the magnet, and the yoke is designed to be narrower than that of the scanning mirror. Thereby, a space at a module corner may be effectively used when the scanning mirror 32 is obliquely arranged to the chassis member 2a as shown in FIG. 5B. Moreover, a configuration, in which the yoke link portion is arranged so as to bypass the upper and lower portions of the scanning unit not in the direction of the back surface of the scanning unit, but across the rotation axis, contributes to the thinner bar code reader, and easy installation of the reader into a module corner as described above.

From the above-described circumstances, there may be realized a scanning unit with a smaller size, stability in swinging operation of a scanning mirror, and high durability according to the present embodiment. Furthermore, when a bar code reader is equipped in a small portable device, the free length of a supporting spring may be made longer without sacrificing the size of the device, the size of a scanning mirror, or the capacity of a coil.

Figure 16:
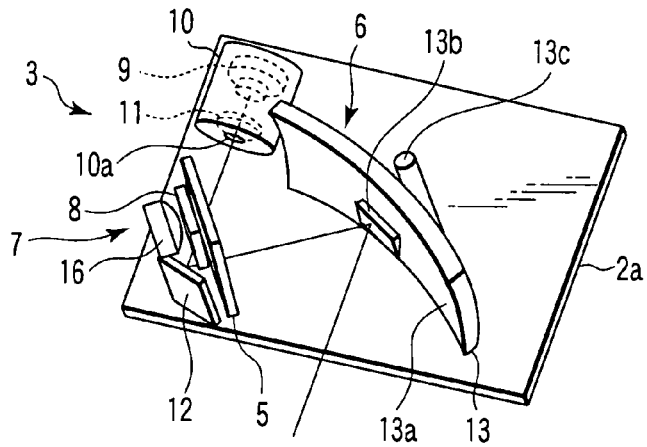
FIG. 16 is a conceptual perspective view showing arrangement of principal components of the bar code reader seen from the obliquely upper right direction in the front, when an exterior member is removed.
Figure 17:
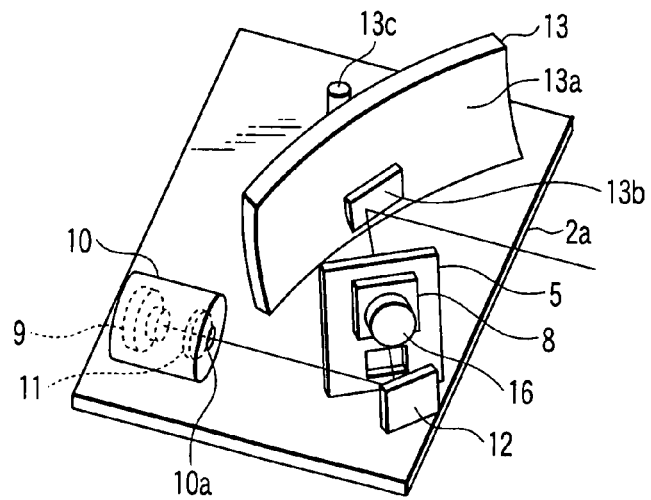
FIG. 17 is a conceptual perspective view showing arrangement of the principal components of the bar code reader seen from the obliquely upper left direction in the front, when the exterior member is removed.
Figure 18:
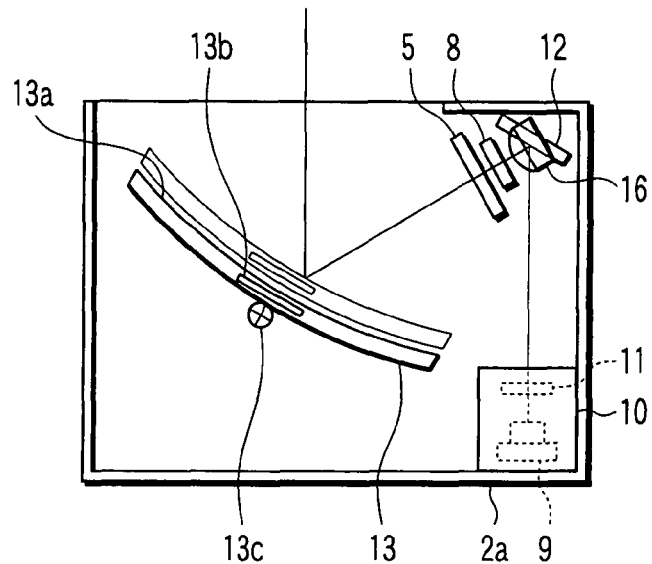
FIG. 18 is a conceptual perspective view showing arrangement of the principal components of the bar code reader seen from the upper direction when the exterior member is removed.

A fifth embodiment according to the present invention will be explained, referring to FIGS. 15 through 18. Here, FIG. 15 is a view showing an external appearance of a bar code reader according to the fifth embodiment of the present invention, FIG. 16 is a conceptual perspective view showing arrangement of principal components seen from the obliquely upper right direction in the front, when a housing as an exterior member of the bar code reader is removed, FIG. 17 is a conceptual perspective view showing arrangement of the principal components seen from the obliquely upper left direction in the front, when the housing of the bar code reader is removed, and FIG. 18 is a conceptual perspective view showing arrangement of the principal components seen from the upper direction when the housing of the bar code reader is removed.

Figure 15:
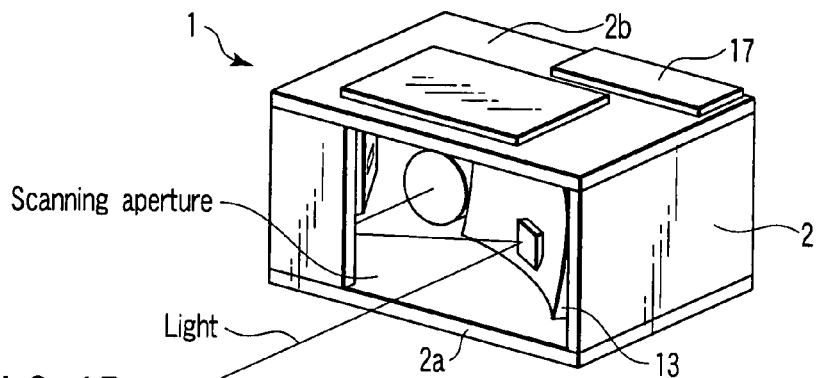
FIG. 15 is a view showing an external appearance of a bar code reader according to a fifth embodiment of the present invention.

As shown in FIG. 15, a bar code reader 1 has a configuration in which a housing 2 includes a chassis member 2a, and a substrate unit 2b equipped with a control circuit and the like, while the unit 2b functions as an upper lid, and the volume of the housing 2 is about one cubic inch or less.

The chassis member 2a supports various kinds of units and members, which will be described later, as one body, and has a set-up surface for external devices on a not-shown under-surface. The chassis member 2a is provided with not-shown holes for mounting screws, and the bar code reader 1 may be mounted in the inside of arbitrary information devices and the like. The bar code reader 1 may be installed in various kinds of information devices such as a portable terminal, a handheld scanner, a POS computer, a portable device, and a communication device in a certain system.

The substrate unit 2b is provided with a connector 17, and bar codes and the like may be read by connecting the bar code reader to not-shown external computers and the like for control of external devices. For example, electric power is supplied from an external computer through the connector to transmit a predetermined trigger signal. A scanning mirror 13 swings by the above trigger signal to emit scanning laser light from the scanning aperture. A user directs the scanning aperture to a bar code, and the scanning laser light is emitted. Return light, which is reflected from the bar code and includes read information, is received through the scanning aperture, and information represented by the bar code is read and reproduced.

A bar code reading function, object detection function, and the like may be simply added by incorporating the above-described bar code reader into a desired device. Accordingly, a manufacturer may easily equip the bar code reader in an electronic device, and may provide an advanced additional function, by which various kinds of information may be input only by reading operation by a user.

Subsequently, an internal configuration of the bar code reader will be explained in detail, referring to FIGS. 15 through 19.

As described above, the bar code reader 1 is accommodated in the housing 2, and the housing 2 includes the chassis member 2a and the substrate unit 2b. The scanning aperture (window) is opened on the housing 2. The after-described scanning laser light is emitted and return light as reflected light is taken in through the scanning aperture. Mainly, a light source unit 3, a deflection mirror 12, a diaphragm portion 5, a scanning unit 6, and a light receiving detection unit 7 are installed on the chassis member 2a.

The light source unit 3 includes: a laser diode (LD) 9 as light source means; a collimator lens 11 collimating the laser light from the laser diode 9; and an accommodation portion 10 accommodating the laser diode 9 and the collimator lens 11.

There may be obtained a light source, which is extremely cheap and has high visibility, by a configuration in which the laser diode 9 has a specification of an external diameter of 5.6 mm, and a wavelength of 650 nm. The specification has been widely adopted for, for example, a CD player.

In the collimator lens 11, the shape of an LD emission diaphragm 10a is decided so as to perform best reading of predetermined objects such as bar codes. Specifically, the collimator lens 11 is adjusted in such a way that laser light is focused at a position of about 200 mm from the scanning aperture of the bar code reader.

In the accommodation portion 10, there is formed the LD emission diaphragm 10a by which the light flux cross section of the laser light, which is irradiated from the laser diode 9 and collimated by the collimator lens 11, is focused to a desired spot size. The above LD emission diaphragm 10a is a rectangular opening of about 0.4 mm to about 1.2 mm. Obviously, the size of the opening is not limited to the above specification, and may be changed according to the design as needed.

Furthermore, a laser emission system is configured to have the light source unit 3 which includes the deflection mirror 12, by which laser light is deflected by reflection, and is directed toward the scanning unit 6.

According to the above configuration, the laser light irradiated from the laser diode 9 is collimated by the collimator lens 11, passes through the LD emission diaphragm 10a to be formed into the desired spot size, and is emitted to the scanning unit 6 after reflection on the deflection mirror 12.

The scanning unit 6 includes: a plane mirror 13b, which is formed on the scanning mirror 13 and functions as a plate-like reflecting mirror; a rotating shaft 13c which swingably supports the scanning mirror 13; and a rotation driving portion 22 (refer to FIG. 19) for reciprocatingly swinging the scanning mirror 13. The scanning mirror 13 rotates while the position relation between the above mirror surfaces 13a and 13b is maintained. The plane mirror 13b forms a part of scanning means, and is formed approximately at the center of the after-described concave mirror 13a.

The rotation driving portion 22 has, for example, a rotating power mechanism and a damping elasticity member, which are not shown, and forms a part of the scanning means. The damping elasticity member is formed with, for example, a metallic plate spring, and the position, the coefficient of elasticity, and the like are set in such a way that the maximum value of a scanning angle is limited, assuming that the rotating shaft 13c is a rotation center. Thereby, the plane mirror 13b reciprocatingly swings at a predetermined angle. The laser light from the deflection mirror 12 is reflected from the above plane mirror 13b, is repeatedly scanned after passing the scanning aperture, and is emitted toward the bar code as scanning laser light.

The light receiving detection unit 7 includes: the concave mirror 13a formed on the scanning mirror 13; a diaphragm portion 5 provided with a PD field diaphragm 5a; a band-pass filter 8; and a photo-detector (PD) 16. Among these, the diaphragm portion 5 (the PD field diaphragm 5a), the band-pass filter 8, and the photo-detector (PD) 16 form light receiving means.

The concave mirror 13a forms reflecting and light condensing means, and is formed as a concave-type reflecting mirror all over the front side of the scanning mirror 13.

Furthermore, a computer connected through the after-described electronic circuit equipped on the substrate unit 2b performs driving and signal processing for the above units and members.

In the first place, the laser light passing through the LD emission diaphragm 10a impinges on the deflection mirror 12. The laser light deflected by the deflection mirror 12 impinges on the plane mirror 13b of the scanning mirror 13 which reciprocatingly swings. The laser light impinging on the plane mirror 13b is reflected as scanning laser light by reciprocating swinging of the plane mirror 13b, and is irradiated on the bar code after passing through the scanning aperture. The above scanning laser light repeatedly performs scanning, assuming that the emission optical axis is the rotating center.

The laser light emitted forward from the scanning aperture impinges on the bar code, and is reflected and scattered by the bar code. The reflected and scattered light traces an optical path equal to that of the emitted light for returning, while spreading, and impinges on the concave mirror 13a of the scanning mirror 13 as return light after passing through the scanning aperture.

The return light which has impinged on the concave mirror 13a is reflected and, at the same time, is condensed. At this time, the light condensing position of the return light reflected from the concave mirror 13a is maintained at almost the same position, though the concave mirror 13a reciprocatingly swings in a similar manner along with the reciprocating swinging of the scanning mirror 13. This is because the concave mirror 13a and the plane mirror 13b are integrally formed with the scanning mirror 13. The PD field diaphragm 5a arranged in the vicinity of the light condensing position passes only regular return light from the bar code, and cuts other light as noise light. The return light which has passed through the PD field diaphragm 5a passes through the band-pass filter 8, and then impinges on the photo-detector 16.

The photodetector 16 has a photoelectric conversion surface (light receiving surface) to generate a detection signal corresponding to the intensity of the impinging light. The detection signal is sent to the substrate unit for various kinds of processing such as current-voltage conversion, amplification, and decoding processing, which will be described later. As the strength of a detection signal is the strength of taken light, and is corresponding to the shadow and the shape information of an object such as a bar code, object information may be acquired, and the presence of an object and a moving object may be detected by judging whether predetermined standards for a bar code and the like are met.

Figure 19:
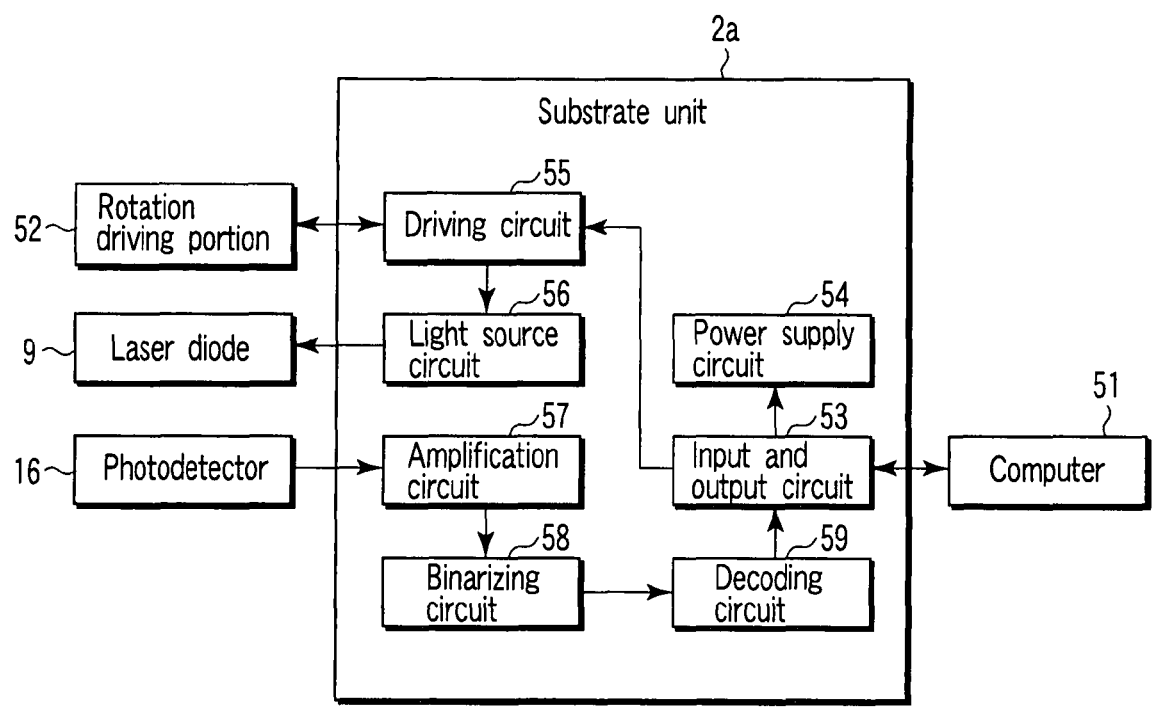
FIG. 19 is a block diagram of a substrate unit.

Subsequently, a block diagram of the substrate unit 2a is shown in FIG. 19 and will be described.

The substrate unit 2a includes: an input and output circuit 25; a power supply circuit 26; a driving circuit 27 which drives the rotation driving portion 22, by which the above-described scanning mirror 13 is swung; a light source circuit 28 which drives the laser diode 9; an amplification circuit 29 which amplifies a detection signal of the photodetector 16; a binarizing circuit 30 which binarizes the amplified detection signal; a decoding circuit 31 which decodes the detection signal to an information signal, and the like. Moreover, the substrate unit 2a is electrically connected to an external computer 21 and the like, and the connector 17 (refer to FIG. 15), supplies a power source to the laser diode 9 and the rotation driving portion 22 for light emission, and receives a detection signal detected by the photodetector 16.

In the above configuration, an electric signal is sent to the rotation driving portion 22 through the input and output circuit 25 and the driving circuit 27 when a driving signal is sent from the external computer 21 to the substrate unit 2a. The rotation driving portion 22 is provided with a not-shown coil, a magnet, and the like, generates driving force for swinging, and reciprocatingly swings the scanning mirror 13. The light source circuit 28 supplies electric power to the laser diode 9 for emitting the above-described laser light. The laser light is reflected from the scanning mirror 13 and the like, which will be described later in detail later, and then, is emitted from the scanning aperture as scanning laser light. The return light reflected by the bar code passes through the scanning aperture, and the detection signal is generated at the photodetector 16. The above detection signal is sent to the amplification circuit, is amplified, and then, is sent to the binarizing circuit for binarizing processing. Then, the binarized detection signal undergoes decoding processing in the decoding circuit, and data on the bar code and the like are generated. The above data is transmitted to the external computer 21 as an output of the bar code reader through the connector 17 connected to the input and output circuit 25.

The bar code reader according to the fifth embodiment may have a configuration in which, for example, when the reader is equipped in a personal digital assistant, a command for reading the bar code and the like is sent from an operating system of the personal digital assistant to the bar code reader, and thereby the bar code is read. The read data may be received as a digital signal on the side of the operating system. Accordingly, a simple and general-use information processing system may be constructed.

Figure 20:
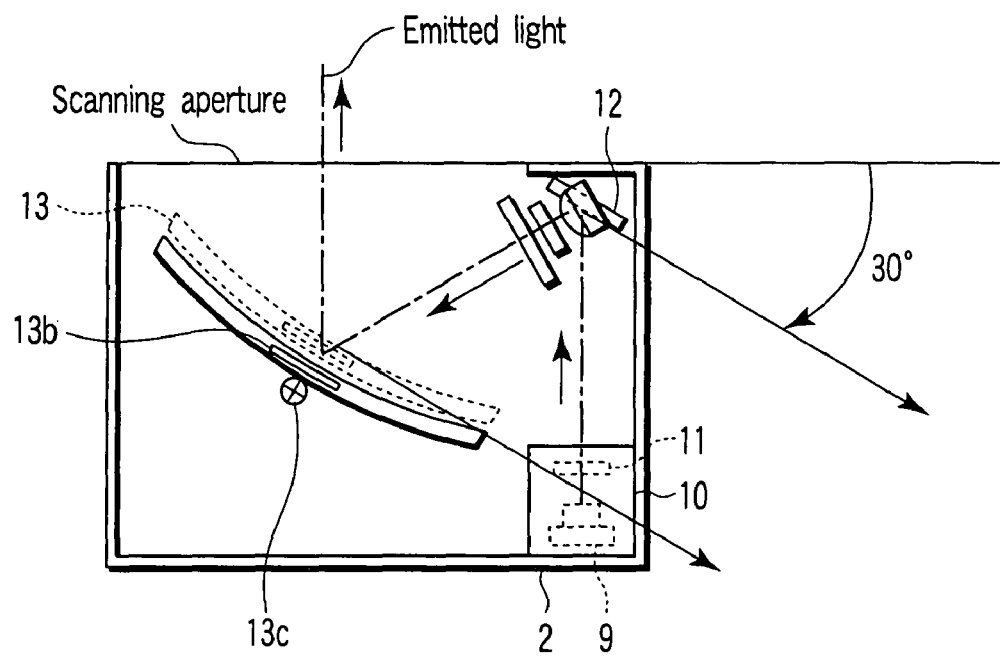
FIG. 20 is a view explaining an optical path of emitted light, based on the arrangement of the components installed on a chassis member.
Figure 21:
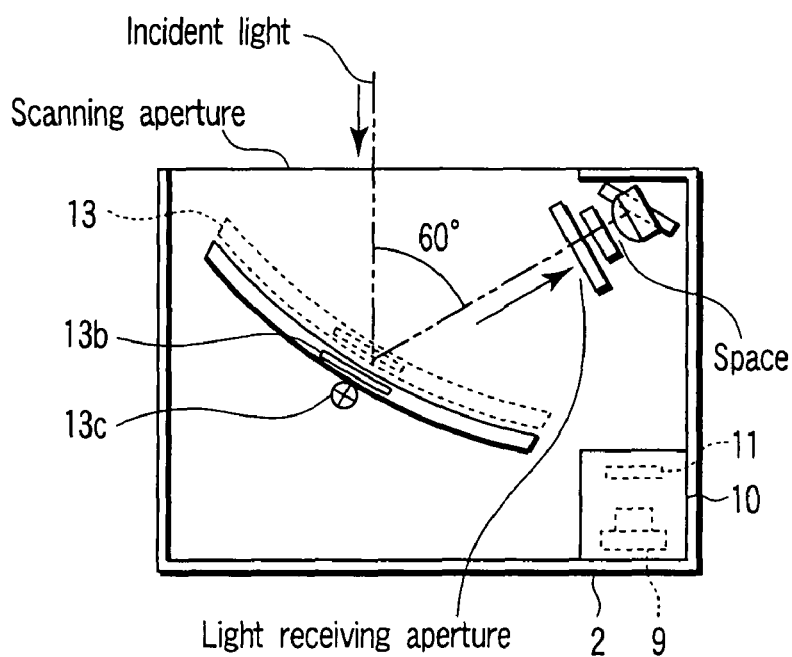
FIG. 21 is a view explaining an optical path of return light, based on the arrangement of the components installed on the chassis member.

Subsequently, the arrangement of various kinds of units installed on the chassis member 2a will be explained, referring to FIGS. 20 and 21.

The accommodation part 10 is fastened to the chassis member 2a in such a way that the laser light to be emitted from the accommodation portion 10 is emitted in almost perpendicular to the scanning aperture. The deflection mirror 12 is arranged at an angle of about 30° with respect to the scanning aperture, and reflects the laser light emitted from the accommodation portion 10 in such a way that the laser light is deflected through an angle of 60°.

Moreover, the scanning mirror 13 forms two reflecting mirror surfaces by the concave mirror 13a and the plane mirror 13b, and the above mirrors are integrally molded as one component by resin molding. A gold thin film is evaporated onto all over the above reflecting mirror surfaces, and the reflectivity of light with a wavelength of about 650 nm is about 90% or more. The concave mirror 13a and the plane mirror 13b are arranged almost in parallel to each other by resin molding. Moreover, the concave mirror 13a is arranged in such a way that the center thereof forms an angle of about 30° with respect to the scanning aperture. Moreover, the laser light emitted from the plane mirror 13b passes through the center of the scanning aperture, and is emitted in a direction perpendicular to the scanning aperture. When the scanning mirror 13 reciprocatingly swings by the substrate unit 2a, the above laser light is repeatedly scanned at a desired angle, centering on a direction perpendicular to the scanning aperture, as described above.

In the above arrangement example, the concave mirror 13a is a concave spherical surface with a radius of curvature of about 20 mm and has a focal distance of about 10 mm. That is, when the arrangement of the concave mirror 13a and the photodetector 16 is decided, the focal distance and the shape of the concave surface are optimized in such a way that the focus of light from an object approaches the position of the photodetector. The details will be described later. Moreover, the center of the concave mirror 13a and the plane mirror 13b are arranged at an angle in such a way that the both mirrors are almost in parallel to each other, seen from the above. The plane mirror 13b, that is, the scanning mirror 13 repeatedly performs rotation operation, centering on the above angle.

The return light (incidence light: refer to FIG. 21) from the bar code is taken in from the scanning aperture, and impinges on the concave mirror 13a with an angle of about 30°. Subsequently, the return light reflected and condensed by the concave mirror 13a advances at an angle of about 60° to the perpendicular line of the scanning aperture (refer to FIG. 21). Moreover, the photodetector 16 is arranged at a position satisfying the above angle relation of 60°. Actually, the photodetector 16 is arranged in a light-shielding case provided with a light receiving aperture (PD field diaphragm 5a). In the above light-shielding case, the band-pass filter 8 is arranged before the photodetector 16.

The above light-shielding case is a plastic component made by injection molding, and the deflection mirror 12 by evaporation is provided outside the case. That is, the light-shielding case and the deflection mirror 12 are integrated. In the light-shielding case, the band-pass filter bonded on a first mounting surface (not shown) is fastened on the optical path of the return light. The photodetector 16 bonded on a second mounting surface (not shown) is fastened with a gap of about several mm from the first mounting surface.

Subsequently, there will be explained relations between the size of the chassis member 2a and the return-light taken-in quantity in the fifth embodiment and comparative examples, referring to FIGS. 22 through 24.

Figure 22:
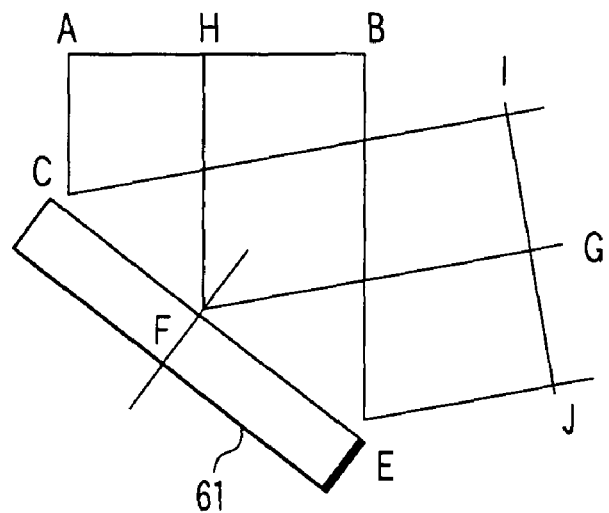
FIG. 22 is a view showing an example of a plane mirror as a first comparative example, wherein the plane mirror has been conventionally used as a scanning mirror of a bar code reader.

FIG. 22 is a view showing a plane mirror 23, which has been conventionally used as a scanning mirror of a bar code reader. FIG. 23 is a view showing a configuration example as a second comparative example, in which a concave mirror 24 for light condensing is further arranged in addition to the plane mirror 23 shown in FIG. 22. FIG. 24 is a conceptual view showing a configuration, seen from the top, in which the scanning mirror 13 having the concave mirror according to the present embodiment is arranged on the chassis member 2a.

In FIG. 22, a line segment AB conceptually represents the width W1 of the above-described scanning aperture, a point H denotes the center of the scanning aperture in a conceptual manner, and CE conceptually represents the scanning mirror surface of a plane. In order to optimize the effective utilization R1 of the space in the above-described formula (1), it is preferable that a surface on which light impinges first after passing through the scanning aperture is a light condensing surface.

The return light reflected from the bar code is taken in from the scanning aperture with a width of the line segment AB. Assuming that the distance between the bar code and the bar code reader is sufficiently larger than the size of the bar code reader, the return light may be considered to be almost parallel light. Here, all the light with a width of the line segment AB is assumed to be reflected from the plane mirror CE. Light with a width of the line segment AB is assumed to impinge on the plane mirror CE, and to be reflected with a width of a line segment IJ. Here, the width of light also equals to the line segment AB even after reflection because the reflecting mirror is assumed to be a plane. Accordingly, a photodetector having a light receiving surface with a size of approximately the line segment IJ is required to be arranged in order to take in all the impinging light from the scanning aperture. That is, when the light taken-in quantity is maximized, the size of the light receiving surface for the photodetector and the size of the reflecting mirror are required to be equal to, or larger than the size of the scanning aperture. Accordingly, the installing space makes up a large portion of spaces for the internal components.

Figure 23:
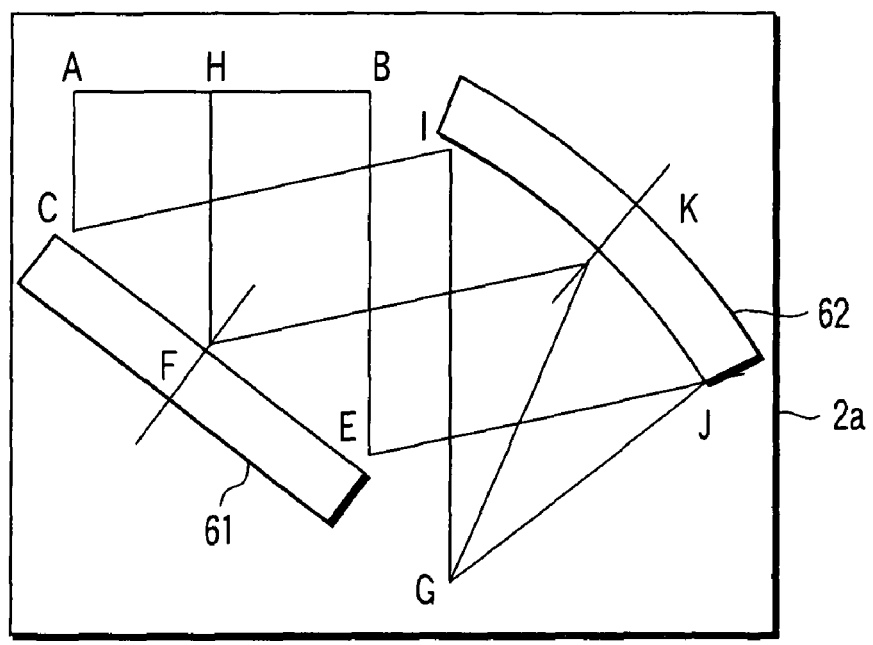
FIG. 23 is view showing a configuration example as a second comparative example, wherein the plane mirror shown in FIG. 22 and a concave mirror are combined and arranged.

Moreover, FIG. 23 is view showing an example in which the concave mirror 24, in addition to the plane mirror 23, is further arranged in an conventional example. In this case, the size of the light receiving surface of the photodetector 16 arranged in a point G may be reduced. However, an outside frame is represented by 2a in FIG. 23, and a required size of the chassis member 2a is required to approximately be the same as that of the outside frame 2a shown in FIG. 23. Here, when as much quantity of return light of the line segment AB as possible is taken in, the plane mirror CE is required to be made larger, and accordingly, the concave mirror IJ is also required to be made larger. That is, the line segment AB and the line segment IJ are required to have approximately the same dimension, and these members resultantly make up a large portion of the installing space. Then, the width W1 of the scanning aperture is reduced to about half the width W0 of the chassis member 2a, and only return light corresponding to the above width is taken in.

Figure 24:
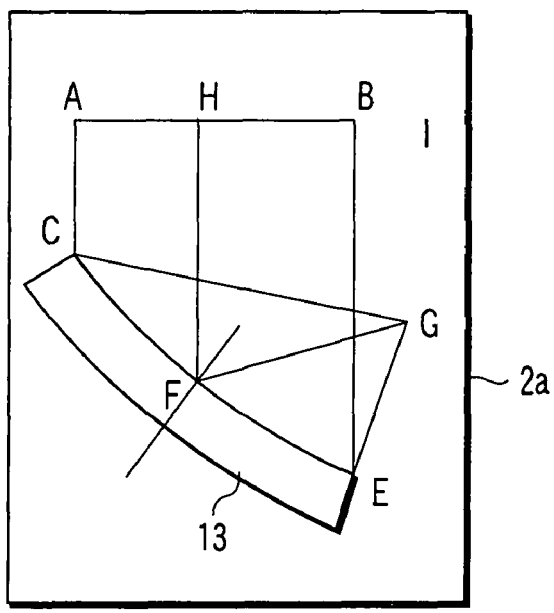
FIG. 24 is a conceptual view showing a configuration, seen from the top, in which a scanning mirror having the concave mirror according to the fifth embodiment is arranged on the chassis member.

On the other hand, the present embodiment has a function by which the return light is reflected and condensed by the concave mirror 13a provided on the scanning mirror 13 as shown in FIG. 24. Here, the point G is a center position of the photodetector. Reflected light is condensed to one point by a configuration in which the concave mirror 13a of the scanning mirror 13 is arranged at a position at which light returning from the bar code is taken first. Consequently, the required space may be reduced, and the size of the chassis member 2a may be reduced without deteriorating the line segment AB of the return-light taken-in width (corresponding to the taken-in light quantity). That is, the width W0 of the chassis member 2a may be reduced approximately to the width W1 of the scanning aperture.

Assuming that a mirror which firstly reflects the light returning from the bar code is a concave one, the space of the bar code reader may be more reduced without shortening the light taken-in width AB, and consequently, the volume V1 of the bar code reader may be more reduced, as is clear from comparison between FIGS. 23 and 24. Alternatively, when the spaces have the same area, the taken-in light quantity S1 may be remarkably increased.

For example, when the space of the chassis member 2a shown in FIG. 24 is extended to a space approximately equal to that of the chassis member 2a shown in FIG. 23, the width of the light condensing of the concave mirror in the bar code reader shown in FIG. 24, that is, the line segment CE may become approximately twice the reflecting surface CE of the plane mirror shown in FIG. 23, and the taken-in light quantity may be almost doubled. Thereby, the signal to noise ratio SNR1 is greatly improved. This is because, though two components of the line segment CE (plane mirror) and IJ (concave mirror), which are equal to each other in size, are required to be arranged in the example shown in FIG. 23, an equal quantity of return light from the bar code to that of FIG. 23 may be received by arranging only one component in the present embodiment shown in FIG. 24. That is, the bar code reader according to the fifth embodiment may take in an approximately equal quantity of light to the quantity corresponding to the width W0 of the chassis member 2a.

Figure 25:
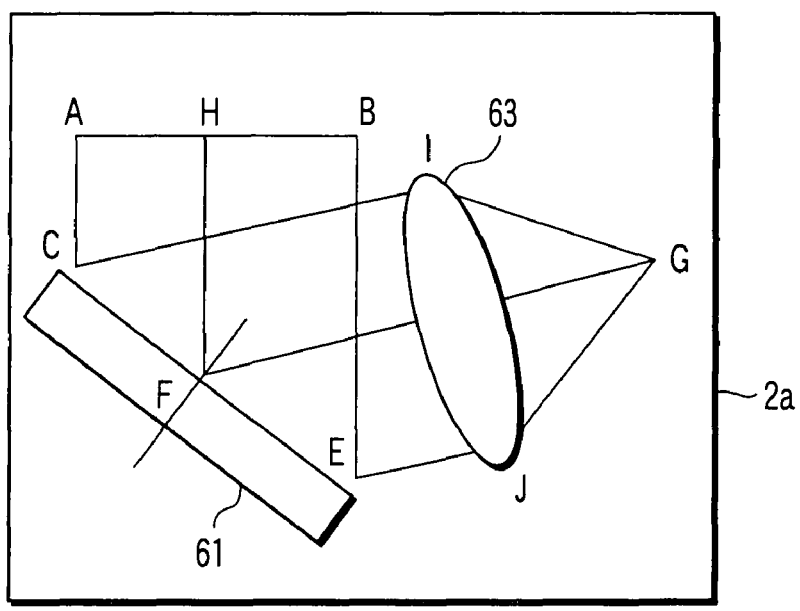
FIG. 25 is a view showing an configuration example as a third comparative example, wherein a light condensing lens, instead of the concave mirror shown in FIG. 23, is arranged in the configuration example.

Subsequently, FIG. 25 is a conceptual view of a third comparative example in which a light condensing lens 41, instead of the concave mirror 24 shown in FIG. 23, is arranged. In the above arrangement example, the plane mirror CE with a size equal to, or larger than that of the line segment AB and the light condensing lens IJ with the equal size are required to be arranged in order to take in all the impinging light AB in a similar manner to that of FIG. 23. Accordingly, the space of the chassis member 2a is made larger because two large components with an equal size are required to be arranged. Conversely, when the space of the chassis member 2a is reduced, the light taken-in width AB is also reduced as the space is reduced. That is, the width W1 of the scanning aperture becomes approximately half the width W0 of the chassis member 2a.

As described above, the volume of the scanning module is made larger, or the signal to noise ratio SNR1 is worsened in the both arrangements of the comparative examples shown in FIG. 23 or FIG. 25 because the plane mirror is used as a mirror which takes in the return light from the bar code first. On the other hand, as the concave mirror is used as a mirror, which takes in the return light from the bar code first, in the present embodiment shown in FIG. 24, the signal to noise ratio SNR1 may be improved without increasing the volume of the scanning module. Accordingly, the effective utilization R1 of the space may be remarkably improved. Though the area H1×W1 of the scanning aperture does not exceed the front area H0×W0 of the bar code reader, the performance may be improved to approximately the limit level according to the present invention because the area of the scanning aperture H1×W1 may approximately approach the area H0×W0 of the bar code reader.

As explained above, the bar code reader according to the fifth embodiment may taken in almost all the return light irradiated on a surface with the area of the scanning aperture with a dimension of W1 in width×H1 in height because the mirror which takes in the return light from the bar code first has a concave surface (light condensing surface). Thereby, the signal to noise ratio SNR1 is greatly improved in comparison with that of a conventional one. Moreover, component costs, assembly costs, and the like are reduced by making the concave mirror surface on a resin-molded component using the vacuum evaporation method, in comparison with those of a case in which another mirror component is bonded.

Subsequently, there will be explained the arrangement and the positions of the photodetector 16 and the deflection mirror 12 in the bar code reader adopting the concave mirror 13a as an optical element which takes in the return light from the bar code first. FIG. 26 shows the scanning aperture provided on the front of a general bar code reader.

The scanning laser light is scanned in the scanning aperture by reciprocating movement as shown by an arrow. Accordingly, when the size of the bar code reader is reduced, the scanning aperture is configured to be reduced in such a way that the scanning range is enclosed. Thereby, the scanning aperture has a rectangular shape with a longer side in the scanning direction. The shape has the length H1 and the width W1 shown in FIG. 26, where W1>H1.

Subsequently, the arrangement of the photodetector 16 in the vicinity of the scanning aperture will be considered.

The thickness of the photodetector 16 is assumed to be T1.

In the first place, when the photodetector 16 is arranged in the inside of the scanning aperture shown in FIG. 26, the arrangement is not preferable because there is caused vignetting of the return light as described above to cause deterioration of the signal S1. Accordingly, it is preferable that the photodetector 16 is arranged outside the scanning aperture, because the signal to noise ratio SNR1 is not deteriorated.

FIG. 27 shows an example in which the photodetector 16 is arranged in the lower portion of the scanning aperture in the vertical direction.

When the photodetector 16 is arranged in the upper portion and the lower portion of the scanning aperture, the thickness T1 is increased. Accordingly, the front area of the bar code reader generally is: (H1+T1)×W1.

Subsequently, FIG. 28 shows an example in which the photodetector 16 is arranged in the right and left direction of the scanning aperture, that is, at the end side in the scanning direction. In the above arrangement, the front area of the bar code reader generally is H1×(W1+T1). When increments of the front area of the bar code reader are compared between the example shown in FIG. 27 and that shown in FIG. 28, the photodetector 16 is advantageously arranged in either the right or left side of the scanning aperture, facing the scanning aperture, in order to reduce the increment as much as possible, because it is assumed that W1>H1. That is, the following relation is obtained: (H1+T1)×W1>H1×(W1+T1). Accordingly, a useless space is reduced in the case of the arrangement in which the photodetector 16 is located in either the right or left side of the scanning aperture, in other words, the arrangement in which the photodetector 16 is located to the side of the scanning direction of the scanning aperture.

Accordingly, according to the arrangement example shown in FIG. 28, the volume V1 of the bar code reader may be prevented from increasing while the signal component S1 with a signal to noise ratio SNR1 is maintained. Accordingly, the effective utilization R1 of the space may be maximized.

As described above, the arrangement of the photodetector 16 has been explained. However, just the same relations hold true for the light source unit 3. That is, when the laser diode 9 (the accommodation portion 10) is also arranged to the side of the scanning direction of the scanning aperture, the effective utilization R1 of the space may be maximized. Especially, when the laser diode 9 or the deflection mirror 12 is arranged at a position in the vicinity of the photodetector 16, a useless free space may be further decreased, and the effective utilization R1 of the space may be further improved.

The light source unit 3 requires comparatively large components such as the laser diode and the collimator lens. When the above components are arranged forward of the scanning mirror 13 (between the scanning mirror 13 and the scanning aperture), there is caused vignetting as described above to cause deterioration of the signal to noise ratio SNR1. Accordingly, in order to maximize the effective utilization R1 of the space, the light source unit 3 is required to be arranged outside the optical path of the return light from the bar code. Then, the accommodation portion 10 including the laser diode 9 is arranged at the back side of the scanning mirror 13 (on the side of a deeper region of the scanning mirror 13, seen from the side of the scanning aperture), and the deflection mirror 12 with a size smaller than the front size of the accommodation portion 10 is arranged on the side of the oblique front surface of the scanning mirror 13. Moreover, the effective utilization R1 of the space is improved because only a smaller space is required without causing vignetting of the light quantity by a configuration in which the emitted light from the accommodation portion 10 is deflected by the deflection mirror 12.

By combining the above-described arrangement examples, there is obtained a preferable configuration in which the deflection mirror 12 and the photodetector 16 are arranged adjacent to each other, and in the vicinity of the end portion of the scanning aperture in the scanning direction toward the scanning aperture. Here, when the scanning aperture according to the fifth embodiment shown in FIG. 15 is seen from the front side, an arrangement shown in FIG. 29 is obtained.

Subsequently, the inclination of the concave mirror 13a in the scanning mirror 13 arranged on the chassis member 2a to the scanning aperture will be explained in detail.

Figure 30A:
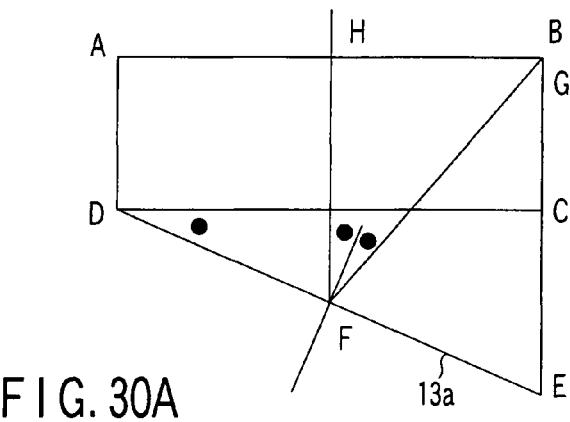
FIG. 30A is a conceptual view showing an arrangement example of a general bar code reader, seen from the top, as a first comparative example.
Figure 30B:
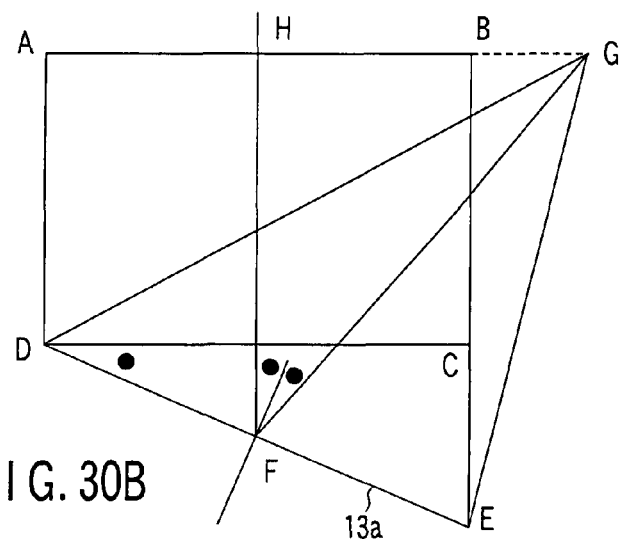
FIG. 30B is a view showing an arrangement example in which the photo-detector is arranged on an outer side than a line segment BE in the first comparative example shown in FIG. 29A.
Figure 31:
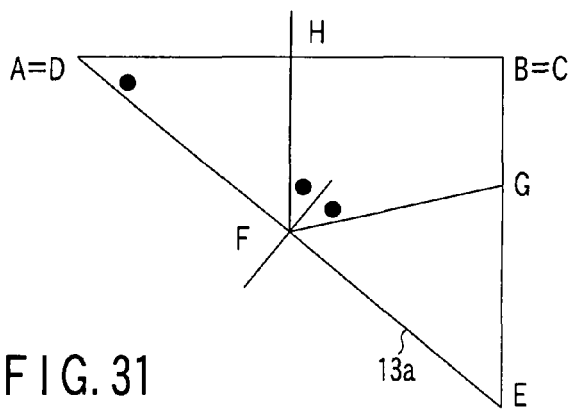
FIG. 31 is a conceptual view showing an arrangement example of a general bar code reader, seen from the top, as a second comparative example.
Figure 32:
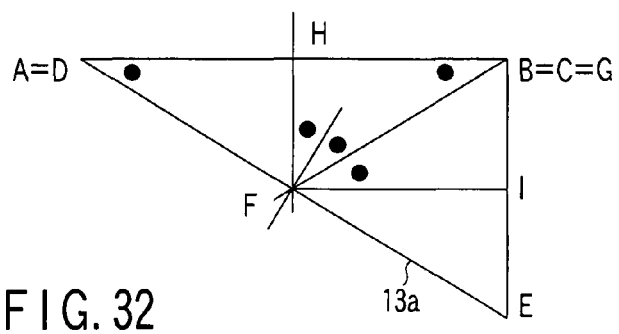
FIG. 32 is a conceptual view showing an arrangement example, seen from the top, according to the fifth embodiment.

FIGS. 30A and 30B are conceptual views each showing an arrangement example of a general bar code reader, seen from the top, as a first comparative example, wherein the inclination of the concave mirror 13a is small. FIG. 31 is a second comparative example, wherein the inclination of the concave mirror 13a is large. On the other hand, FIG. 32 is a conceptual view showing an arrangement example, seen from the top, according to the fifth embodiment. In these drawings, the line segment AB corresponds to the scanning aperture, and the line segment DE is an abbreviated expression of the concave mirror, considering the concave mirror as a plane. Here, the center position of the photoelectric conversion surface of the photodetector is denoted by G.

In the first place, an example in which the inclination of the concave mirror 13a is small will be described, using FIG. 30A.

On the scanning aperture, the return light with the width AB is taken in, and impinges on the concave mirror 13a represented as the line segment DE along the HF direction. The impinging light is reflected by the concave mirror 13a. As the angle of incidence and the angle of reflection on the concave mirror 13a are equal, the return light which has impinged along HF is reflected and proceeds generally along the FB direction, wherein the direction of the normal line of the concave mirror 13a is between the impinging direction and the reflecting direction.

Here, a configuration in which the photodetector is arranged on the line segment FB in the quadrilateral ABED is not preferable, because vignetting of the return light is generated as described above. Moreover, when the photodetector is arranged at a position extending far away toward the outside from the line segment BE, other components may not be arranged in the inside of the triangle DEG as shown in FIG. 30B, because there is caused the vignetting. Thereby, components may not be arranged in the inside in the case of the triangle DEG, in addition to the case of the quadrilateral ABED, so to speak, the space in the triangle becomes a dead space. Accordingly, it is preferable from a viewpoint of the smaller dead space that the position G of the photodetector is brought close to the point B to make the triangle DEG smaller, and at the same time, the area of the quadrilateral ABED is also made smaller.

Here, when the point B is on the extension line of the line segment CE, the area of the quadrilateral ABED as the dead space is represented by the following formula (4) from geometric relations:

$$\text{QUADRILATERAL ABED} = \text{QUADRILATERAL ABCD} + \text{TRIANGLE CED} = AB^2/(2 \times \tan 2\theta 1) \quad (4)$$

where θ1 is represented by a black spot in the drawings.

The θ1 is an inclination angle CDE of the concave mirror 13a to the scanning aperture, and the θ1 may be from 0 to 90° or less. As tan 2θ1 is an increasing function of θ1, the area of the quadrilateral ABED is a decreasing function of the inclination angle θ1 of the concave mirror 13a from the formula (4). That is, when the inclination θ1 of the concave mirror 13a is increased, the quadrilateral ABED as the dead space may be reduced, while the light taken-in width AB is maintained. Thereby, reduction in the volume V1 of the above-described bar code reader may be realized without deteriorating the taken-in light quantity S1. At this time, the point B coincides with the point C at the limit of optimization.

Subsequently, a case in which the inclination angle of the concave mirror 13a is large will be explained, using FIG. 31.

The line segment AB corresponds to the scanning aperture, and the line segment DE conceptually represents the scanning mirror surface 13a. For convenience of explanation, in FIG. 31, the point A and the point D, and the point B and the point C are noted to coincide with each other for correspondence with FIG. 30A because there is generated no rectangular space like the quadrilateral ABCD shown in FIG. 30A when the inclination angle of the concave mirror 13a is large.

The impinging return light is taken in along the HF direction with a width of the line segment AB. As the light reflected by the concave mirror DE is reflected in such a way that the angle of incidence and the angle of reflection are equal to each other, the reflected light proceeds generally along the FG direction, wherein the direction of the normal line of the concave mirror DE is between the impinging direction and the reflecting direction.

Based on a similar consideration to the above-described one, the vignetting is generated to reduce the impinging light quantity S1 when the photodetector is arranged on the line segment FG. Accordingly, deterioration in signals is caused to reduce the effective utilization R1 of the space. On the other hand, when the photodetector is arranged outside the line segment BE, and the position of the photodetector is represented by G, other components and the like may not be arranged in the inside of the triangle DEG as a space toward the photodetector to increase the dead space and to increase the volume V1 of the bar code reader.

Accordingly, the photodetector G is preferably arranged in the vicinity of the line segment BE. As shown in FIG. 31, the point G is located on the line segment BE. In a similar manner to those of the above-described cases, the area of the triangle ABE as a dead space may be obtained by the following formula (5) from geometric relations:

$$\text{TRIANGLE ABE} = AB \times BE/2 = AB^2 \times \tan \theta 1/2 \quad (5)$$

where θ1 is represented by a black spot in the drawings. Here, it is preferable to reduce the inclination angle θ1 of the concave mirror DE in order to minimize the area of the triangle ABE, because tan θ1 is an increasing function of θ1 when the θ1 is within 0 to 90°. When θ1 is decreased, the center position G of the photodetector coincides with the point C at the limit. At this time, the required space is minimized, and the effective utilization R1 of the space is maximized, though the width AB of the taken-in light quantity is maintained.

Based on the arrangement examples shown in FIGS. 30A, 30B, and 31, a useless space may be minimized when the center G of the photodetector 16 coincides with the point C. The above state is shown in FIG. 32. Here, there is drawn the line segment FI passing through the midpoint F of the line segment DE and in parallel to the line segment AB.

As shown in FIG. 32, the triangle FAB is an isosceles triangle because the point F is on a line which is perpendicular to the line segment AB, and passes through the center H of the line segment AB. That is, BF=AF, ANGLE FBA=ANGLE BAF=ANGLE BFI=θ1. Then, the angle θ1 becomes 30° because the angle θ1 is obtained by dividing the angle HFI=90° into three angles.

Furthermore, the straight line FG connecting the center point F of the line segment DE of the concave mirror 13a and the center G of the photoelectric conversion surface of the photodetector 16 has an angle of 30° to the scanning aperture AB. Then, the line FH which is perpendicular to the scanning aperture AB and passes through the center H of the scanning aperture, and the straight line FG passing through the center G of the photoelectric conversion surface of the photodetector 16 form an angle of 60°.

At this time, the area of the triangle ABE is minimized. That is, there is minimized the area of the dead space in which components may not be arranged.

Moreover, in the present embodiment, the line FH which passes through the center H of the scanning aperture AB and is perpendicular to the scanning aperture, and the perpendicular line FG of the photoelectric conversion surface of the photodetector 16 also form an angle of 60°. Even in this case, the area of the triangle ABE is minimized, and the area of the dead space may be minimized. Moreover, the photodetector 16 is directed toward the GF direction, and the direction of the vector GF coincides with that of the vector FH, that is, the perpendicular vector to the scanning aperture when the vector GF is rotated by 120° in the clockwise direction.

As described above, in the present embodiment, the required space may be minimized without deterioration of the taken-in light quantity S1 by a configuration in which the concave mirror and the photodetector are arranged at the above-described predetermined angle to the scanning aperture as shown in FIG. 32. At this time, the best angle relation may be obtained in which the effective utilization R1 of the space may be maximized. In other words, the depth DO of the bar code reader may be minimized without deteriorating the taken-in light quantity. The bar code reader, shown in FIG. 15, according to the present embodiment has the angle relation between internal components as shown in FIG. 32 to optimize the effective utilization R1 of the space.

Figure 33:
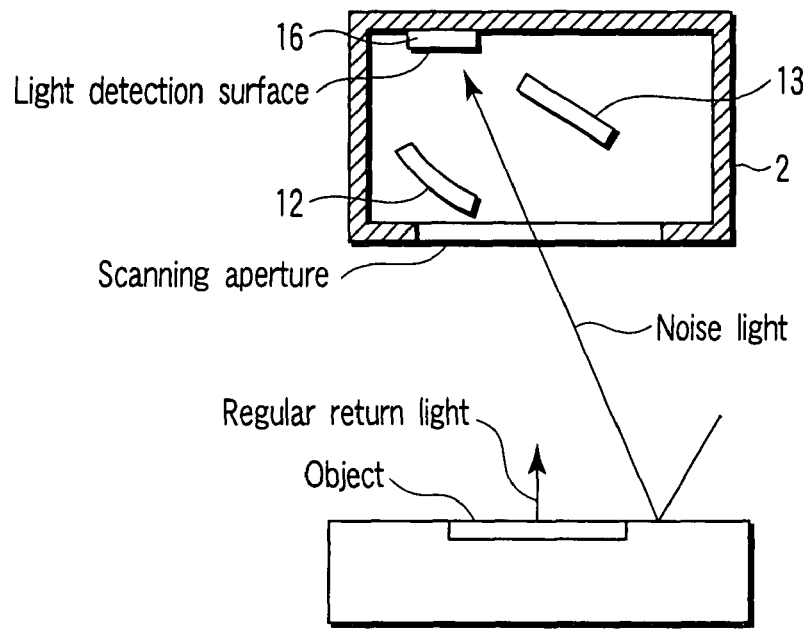
FIG. 33 is a view showing a configuration example in which an angle between a perpendicular line of a photoelectric conversion surface and a normal line of a scanning aperture of a general photo-detector is about 0°.

Furthermore, when the effective utilization R1 of the space is optimized in FIG. 32, the direction GF of the photodetector 16 forms about 120° to the return optical axis. The bar code reader according to the present embodiment has another new advantage by the above arrangement. The above advantage will be explained as follows. For example, an arrangement example of a photodetector based on a conventional technology is shown in FIG. 33 as a comparative example. For reference, the plane mirror 23 and the concave mirror 24 as a light condensing surface are conceptually shown.

As shown in FIG. 33, unnecessary noise light, in addition to regular reflected and scattered light from the bar code, directly impinges on the photoelectric conversion surface of the photodetector 16. As the above noise N1 reduces the signal to noise ratio SNR1, deterioration in the reading performance is caused. Especially, under the sun light, the indoor fluorescent-light illumination, a special light source in a warehouse, and the like, there is remarkable deterioration in performance when outside light enters as noise. As the bar code reader is built in an arbitrary portable device and the like, and is used under all the outside-light environments, the usage of the product is remarkably restricted when the performance greatly depends on the working outside-light environment.

Moreover, when the bar code reader is incorporated into general devices, the inside of the bar code reader is usually sealed for dust prevention and the like by providing transparent resin, or a glass window in the vicinity of the scanning aperture. As the window usually has a reflectivity of several percents, a part of emitted light from a plane mirror is reflected from the window, and becomes noise light. Accordingly, when the noise light is received by a photodetector, the noise N1 is increased to cause a problem that the signal to noise ratio SNR1 is deteriorated.

Especially, the window is designed under a state in which a priority is given to requirements from exterior design, or the design has already been completed. Accordingly, when there are no appropriate noise-light measures for the bar code reader, there is caused a problem that, before the bar code reader is actually equipped, it is not certain whether the bar code reader is usable. Alternatively, when an outside user buys the bar code reader, and designs the window for arrangement of the bar code reader in a device of the user, the user is required to understand laser optics system, and noise light to cause problems in the development period and the design cost.

Figure 34:
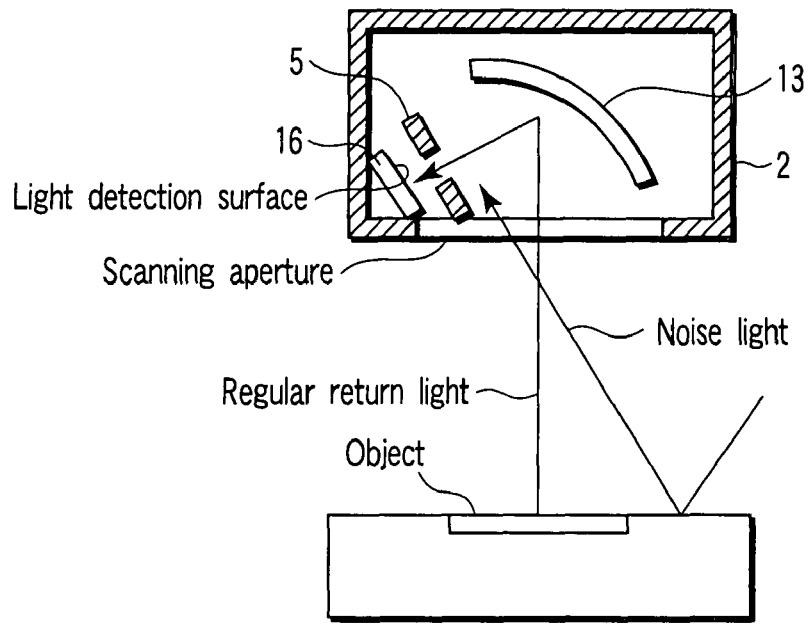
FIG. 34 is a conceptual view showing angle relations in the internal arrangement of the bar code reader according to the fifth embodiment.

Based on the arrangement of the photodetector in the bar code reader according to the fifth embodiment shown in FIG. 34, noise-light measures are greatly improved in comparison with that of the conventional example shown in FIG. 33. That is, according to the present invention, the photoelectric conversion surface of the photodetector 16 is the inside of the housing 2, and is arranged to be directed toward the scanning mirror 13. That is, the direction of the photodetector 16 is arranged to form an angle of about 120° to the return optical axis. Accordingly, there is configured a preferable angle arrangement in which the noise light which enters from the scanning aperture has difficulty in impinging directly on the photo-detector 16. Thereby, even a user who is not comparatively familiar with the laser optics system and the noise light may buy the bar code reader according to the present invention, and perform exterior design of a window and the like.

Furthermore, for consideration of the best angle arrangement of the photodetector 16, explanation will be made, using FIGS. 35A and 35B.

Figure 35A:
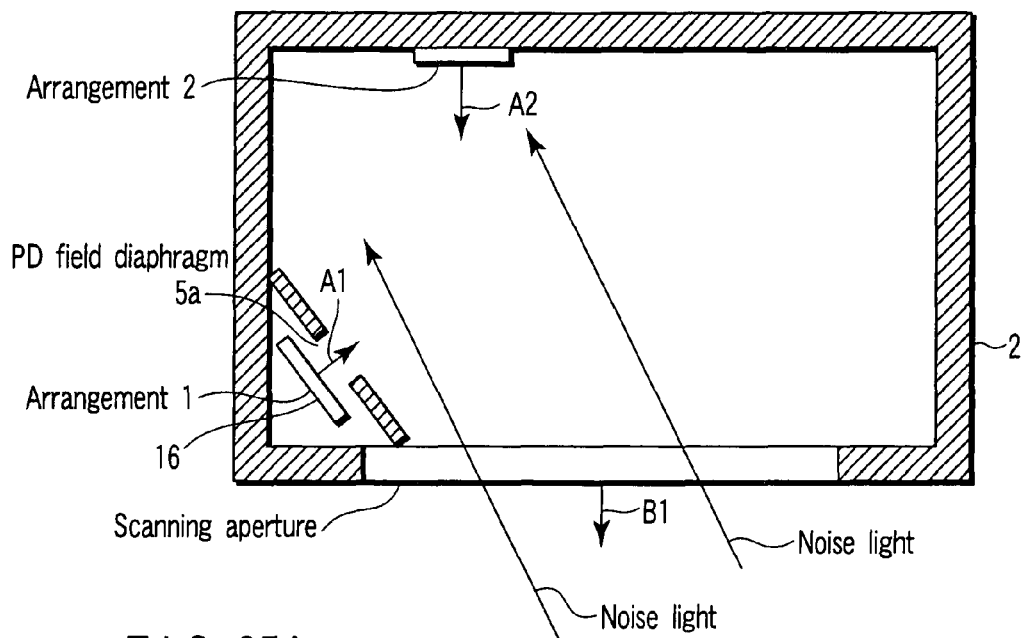
FIG. 35A is a conceptual view comparing angle arrangements of the photo-detector for best selection.

FIG. 35A is an outline view showing relations between photodetectors disposed at two locations (arrangement 1 and arrangement 2) in the bar code reader and the noise light. The arrangement 1 shows the one according to the fifth embodiment, and the vector A1 of the direction perpendicular to the photoelectric conversion surface of the photodetector is directed toward the scanning mirror 13. Moreover, the arrangement 2 is the one according to a conventional technology as a comparative example, and the vector A2 of the direction perpendicular to the photoelectric conversion surface of the photodetector is directed toward the scanning aperture. Furthermore, the vector B1 is perpendicular to the scanning aperture, and is directed from the center on the scanning aperture toward the outside of the bar code reader.

Figure 35B:
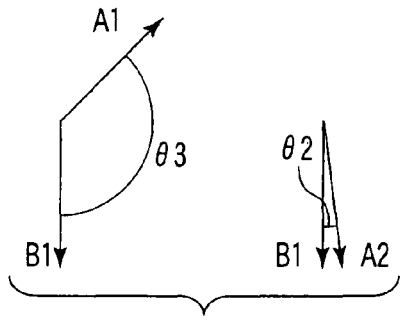
FIG. 35B is a view for further explaining that an angle θ2 is an acute angle, and an angle θ3 is an obtuse angle, when a vector A1, a vector A2, and a vector B1, which are shown in FIG. 35A are selected to form angles, that is, the vectors A2 and B1 form the angle θ2, and the vectors A1 and B1 form the angle θ3.

Moreover, FIG. 35B illustrates an angle θ2 between the vector B1 and the vector A2, and an angle θ3 between the vector B1 and the vector A1.

In the case of the arrangement 2, the vector A2 and the vector B1 are approximately in parallel to each other as an angle relation. As the noise light enters the inside of the housing in a direction approximately opposite to that of the vector B1, the noise light easily impinges on the photodetector, degrading the signal-to-noise ratio SNR1.

On the other hand, in the case of the arrangement 1, that is, in the case of the fifth embodiment, the vector A1 and the vector B1 form an obtuse angle as the angle relation. Concretely, an angle θ3 between the vector A1 and the vector B1 is 120° (refer to FIG. 32). Thereby, though the noise light enters the inside of the housing in a direction approximately opposing that of the vector B1, the noise light has difficulty in impinging on the photo-detector 16.

Figure 36:
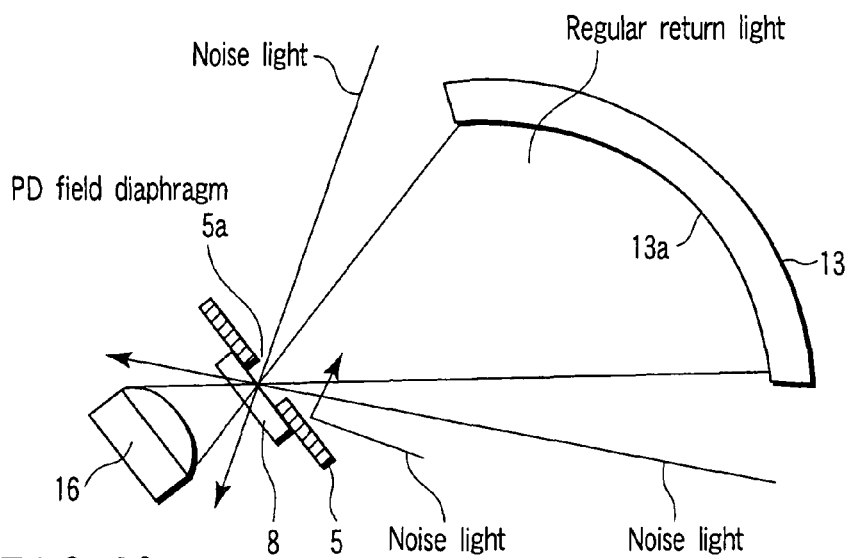
FIG. 36 is a view showing an arrangement example in which a band-pass filter is added to the configuration shown in FIG. 35A.

FIG. 36 shows an arrangement example in which the arrangement example shown in FIG. 35A with regard to the photodetector of the bar code reader according to the present invention is further expanded, and the band-pass filter is added.

In this arrangement example, the PD field diaphragm 5a and the band-pass filter 8 are adjacent to each other, and the photodetector 16 is arranged with a distance of about 1 mm from the above diaphragm and the filter.

The regular return light condensed by the concave mirror 13a is focused in the PD field diaphragm 5a of the diaphragm portion 5 and passes therethrough. The transmitted return light is received by the photodetector 16. On the other hand, the noise light entering positions other than the PD field diaphragm 5a is completely intercepted by the PD field diaphragm 5a. Furthermore, even if there is light entering the PD field diaphragm 5a, the noise light entering from an angle range excluding that of the concave mirror 13a has a different entering angle from that of the regular return light, proceeds through the space as if the noise light runs away, and does not reach the photoelectric conversion surface of the photodetector 16. That is, the arranged position of the photodetector 16, and the space between the photodetector 16 and the diaphragm portion 5 are most appropriately set in such a way that the noise light does not impinge on the photodetector. The noise light may be preferably intercepted by the arrangement of the PD field diaphragm 5a as the light receiving aperture and the photodetector 16 separated from the related PD field diaphragm 5a, and, furthermore, the above-described angle relation of the obtuse angle. The arrangement of the components in the bar code reader according to the present embodiment is shown in FIGS. 17, 21 and the like as described above.

Moreover, according to the band-pass filter 8, only light with the same wavelength as that of the laser light irradiated from the laser diode is passed and is led to the photoelectric conversion surface of the photodetector 16 as shown in FIG. 35A. Accordingly, light with a wavelength other than that of the laser light is preferably intercepted as noise light.

The above-described patent document (U.S. Pat. No. 6,360,949) and the like have disclosed an arrangement in which the light receiving surface (photoelectric conversion surface) of the photodetector 16 is directed toward the scanning aperture. Accordingly, the arrangement has an angle arrangement in which the noise light entering from the scanning aperture may not be intercepted from a structural view.

In the present embodiment, the diaphragm portion 5 and the deflection mirror 12 are molded as one body in the above-described light-shielding case to form one component. That is, after the above light-shielding case is molded, the mirror surface is formed on a portion in which the deflection mirror is installed in the light-shielding case, by evaporation. Subsequently, the band-pass filter and the photodetector 16 are structured to be built in, bonded and fastened in the light-shielding case. At assembling to the chassis member 2a, the angle relation between the deflection mirror and the scanning aperture and the like may be easily realized only by bonding the above light-shielding case. Here, in an actual bar code reader, the band-pass filter 8 passing only light with a wavelength in the vicinity of 650 nm is placed as shown in FIG. 36 in such a way that the PD field diaphragm 5a is closed from the inside, though the above structure is eliminated in FIG. 35A.

When the PD field diaphragm 5a of the photoelectric conversion surface of the photodetector 16 and the light receiving aperture is arranged in such a way that the above-explained angle relation is satisfied, the volume V1 of the bar code reader may be reduced, the signal element S1 may be increased, and furthermore, the noise element N1 such as noise light may be decreased. All the parameters represented by the above-described formulae (1) and (2) are improved at the same time, and the effective utilization R1 of the space may be remarkably improved.

The design is made to realize easy assembling, and reduction in component costs and assembling costs.

Furthermore, the allowable range for assembling errors at manufacturing is made wider, and easy assembling is maintained. For example, when the angle relation between the concave mirror 13a and the photodetector 16 is almost equal, there is caused no problems even if the positions of other components are shifted by about several millimeters. Moreover, the size of the PD field diaphragm 5a and the size of the photoelectric conversion surface of the photodetector 16 usually are about 2 to 5 mm. Therefore, even if the arranged positions of optical components and the like are shifted by about several millimeters due to manufacturing errors, similar advantages may be obtained with no problems considering the spot diameter of the return light.

Subsequently, a sixth embodiment according the present invention will be explained.

Figure 37A:
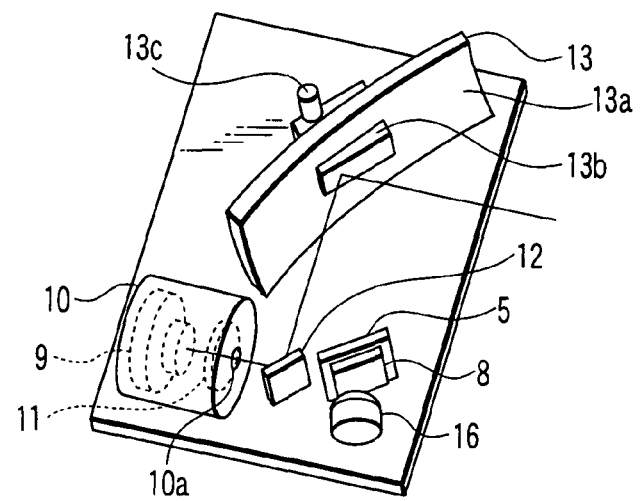
FIG. 37A is a perspective view showing arrangement of principal components of a bar code reader according to a sixth embodiment seen from the obliquely upper direction, when an exterior member is removed.
Figure 37B:
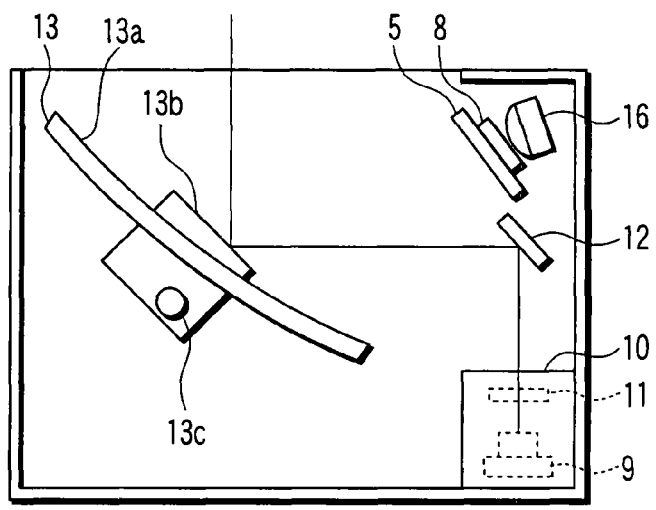
FIG. 37B is a conceptual view showing the arrangement of the principal components of the bar code reader seen from the upper direction, when the exterior member is removed.
Figure 37C:
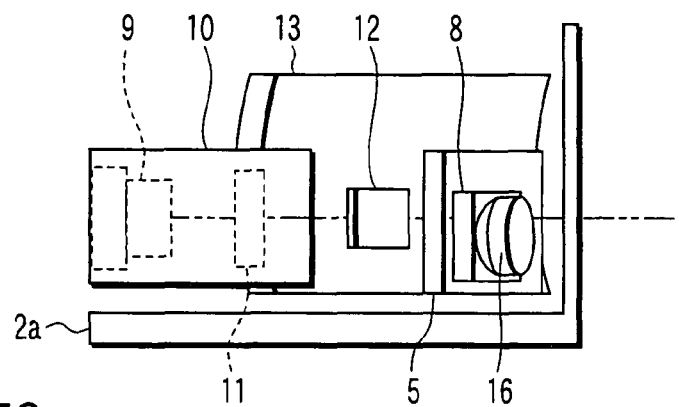
FIG. 37C is a conceptual view showing the arrangement of the principal components of the bar code reader seen from the side direction, when the exterior member is removed.

FIG. 37A is a perspective view showing arrangement of principal components seen from the obliquely upper direction, when an exterior member of a bar code reader according to a sixth embodiment is removed, FIG. 37B is a conceptual view showing the arrangement of the principal components seen from the upper direction, and FIG. 37C is a conceptual view showing the arrangement of the principal components seen from the side direction, when the exterior member of the bar code reader is removed. Here, components similar to those of the above-described fifth embodiment (FIGS. 16 through 18) will be denoted by the same reference numerals in the present embodiment, and the description thereof will be omitted.

In the sixth embodiment, an emission optical path of laser light by a light source unit 3 installed on the chassis member 2a, a deflection mirror 12, a diaphragm portion 5, a scanning unit 6, and a light receiving detection unit 7, and an incidence optical path of return light are arranged at approximately the same height. In the above-described first embodiment, the light receiving means (the diaphragm portion 5, the band-pass filter 8, and the photodetector 16) is hierarchically arranged on the deflection mirror, and the height of the emission optical path between the deflection mirror 12 and the plane mirror 13b and the height of return light optical path between the concave mirror 13a and the PD field diaphragm 5a are different from each other. However, in the present embodiment, both the heights are configured to be approximately the same.

In the present embodiment, the deflection mirror 12 is installed on the chassis member 2a while the mirror 12 is arranged nearer to the side of the light source unit 3 than to the light receiving means. Moreover, the deflection direction by the plane mirror 13*b* is changed by a configuration in which the angle of the plane mirror 13*b* is inclined in such a way that the thickness at the side of the light source unit 3 is thinner in comparison with that of the center of the concave mirror 13*a*. As shown in FIG. 37B, the plane mirror 13*b* has a wedge shape, seen form the top. In this arrangement example, the laser light emitted from the laser diode 9 is deflected by about 90° by the deflection mirror 12, and emitted toward the plane mirror 13*b*. The light is reflected from the plane mirror 13*b* at an angle of about 90° as the scanning center, and is emitted from the scanning aperture as the scanning laser light.

Therefore, in the present embodiment, the angle of incidence of the laser light to the deflection mirror 12 and the plane mirror 13*b* become shallower in comparison with that of the fifth embodiment, but the scanning direction is adjusted by changing the angle of the plane mirror 13*b*.

According to the present embodiment, the deflection mirror 12 and the light receiving means are arranged on the chassis member 2*a*, adjacent to each other. Accordingly, the space may be further effectively used. By this arrangement, the hierarchical structure between the deflection mirror and the light receiving means is eliminated in comparison with the first embodiment. Therefore, the space in the height direction may be further reduced to cause an advantage, especially, in a thinner structure.

Moreover, it is understood from a viewpoint of the present invention that the effective utilization of the space is not optimized in prior arts disclosed in patent documents (U.S. Pat. Nos. 6,360,949, and 6,303,927). The above circumstances show that it is not easy to find the best arrangement of components though the present invention obtains the best one. This is because there are innumerable combinations for the arrangement of components, and the design tends to be complicated.

For example, when the laser diode is arranged in the chassis member, there are many options for arrangement, for example, eight corners in a housing with a cubic shape, six wall surfaces and the like as a position, and with various kinds of angles for each of the positions. When the photodetector is arranged, there may be a number of arrangements in a similar manner. Moreover, there are innumerable options for the mirror components such as a concave or panel surface, and the number of components.

If there are ten kinds of arrangements for one of the above members, there may be caused ten to the sixth power=one million combinations when the number of arrangements is estimated for a case in which there are arranged about six principal functional elements such as a laser diode, a photodetector, a deflection mirror, a scanning mirror, a light condensing member, and a band-pass filter. Furthermore, infinite number of combinations are further generated when combinations of angles such 60°, which has been explained, are considered. When the number of mirrors and the like is increased in order to improve the performance, the number of combinations is further increased. Therefore, the prior arts are surely successful in modules, but it is difficult to say that design direction has been found. Furthermore, when there is noted only the signal to noise ratio, which is examined in common designing in conventional technologies, the superiority or inferiority of the design is not discriminated when the sizes of the chassis member and the mirror are somewhat changed. That is, the performance is changed when a light taken-in area is increased by making the size of the chassis member larger even if the arrangement of components is inferior. In this case, a user has to provide a space in which a comparatively large bar code reader is arranged, and furthermore, incur an increment in component costs.

However, according to the present invention, the superiority of a design may be decided for a basic configuration arrangement by noting the signal to noise ratio per unit volume. That is, it is clearly illustrated that the cost performance including the space and the like is superior to that of a conventional product. Actually, according to the present invention, there may be provided a simple and functional optical scanning scanner which has better performance, despite its very simple design, in comparison with that of a conventional product with a possibly complex configuration of components. In this meaning, the present invention is based on a design philosophy and orientation essentially different from those of conventional technologies.

Here, the above described bar code readers according to the fifth and sixth embodiments are not limited only to the above-described aspects. For example, the bar code reader is preferable for reading a bar code according to JAN, Code 39, Codabar, ITF and the like. Furthermore, it is obvious that the bar code reader may be applied to other usage only by replacing software in the above-described decoding circuit 31 shown in FIG. 19. For example, the bar code reader may be used as an on-board moving-object sensor, or as a object detection sensor for hazard control by incorporating software for recognition of moving object and the like. In this case, infrared light is used for the light source, and the reflectivity and the like of the band-pass filter and the mirror is designed according to the wavelength of the infrared light. The bar code reader according to the present embodiment may be equipped in a laser scanning device, a bar code reader, a distance sensor, a printer, an inter-vehicle sensor, a crime prevention sensor, a scanning type laser microscope, a personal digital assistant, and the like.

Moreover, a read light signal may be digitized, and the signal may be output as it is to form a shape sensor. According to the above configuration, shape information may be acquired on the side of the external computer shown in FIG. 19, to construct more detailed application. The bar code reader may be used for a case, for example, in which laser light is irradiated on arbitrary samples placed on a stage to read a fine structure.

Moreover, it is recognized from a viewpoint of the present invention that the effective utilization of the space is clearly inferior in prior arts disclosed in patent documents (U.S. Pat. Nos. 6,360,949, and 6,303,927). The above circumstances show that it is difficult to find an arrangement of components like the arrangement according to the present invention. This is because there are innumerable combinations for the arrangement of components.

For example, when the laser diode is arranged in the chassis member, there are options for arrangement, for example, eight corners in a housing with a cubic shape, six wall surfaces and the like as a position, and with various kinds of angles for each of the positions. When the photodetector is arranged, there may be a number of arrangements in a similar manner. Moreover, there are innumerable options for the mirror components such as a concave or panel surface.

If there are ten kinds of arrangements for one of the above members, there may be caused ten to the fifth power=100,000 combinations when the number of arrangements is estimated for a case in which there are arranged about six principal functional elements such as a laser diode, a photodetector, a deflection mirror, a scanning mirror, a light condensing mirror, and a band-pass filter. Furthermore, infinite number of combinations are further generated when combinations of angles such 60°, which has been explained, are considered.

Accordingly, it is not always said that the present invention may be easily obtained from simple combinations of prior arts.

The present embodiment includes the following aspects of the invention:

(1) A scanning mirror having:
a movable portion having at least an optical element and a coil; and
a supporting member,
wherein an one end of the supporting member is held by the movable portion, and the other end is held by a fastening member,
the supporting member supports the movable portion in such a way that the movable portion may be inclined to the fastening member,
the coil arranged in the movable portion has a hollow portion, and
the supporting member is freely inserted into the hollow portion of the coil.

(2) The scanning mirror as described in the paragraph (1), wherein
the movable portion is rotated around a shaft, and
the shaft is arranged between the optical element and the coil.

(3) The scanning mirror as described in the paragraph (1), wherein
the optical element and the coil are in a counterbalanced state to the shaft of the movable portion.

(4) The scanning mirror as described in the paragraph (1), wherein
a magnetic circuit cooperating with the coil is arranged in a direction perpendicular to the supporting member, and the magnetic circuit is offset to the shaft.

(5) The scanning mirror as described in the paragraph (1), wherein
a displacement-regulating member of the movable portion is arranged at the shaft position in the direction of the shaft of the supporting member.

(6) The scanning mirror as described in the paragraph (1), wherein
the optical element and the coil in the movable portion are held at one end of the supporting member by a movable side holding member, and a surface of the movable side holding member is opened while the surface is parallel to the supporting member.

(7) A bar code reader, having:
a housing portion having a scanning aperture;
a rotating portion having a rotating shaft in the housing;
a light condensing portion mounted on the rotating portion; and
light receiving means which is mounted in the housing, and has a photoelectric conversion surface,
wherein the direction of the light receiving means is set in such a way that a perpendicular line of the scanning aperture and a perpendicular line of the photoelectric conversion surface form an angle of about 60° around the rotating shaft.

(8) A bar code reader, having:
a housing having a scanning aperture;
a rotating portion having a rotating shaft in the housing;
a light condensing surface mounted on the rotating portion; and
light receiving means for receiving light which passes through the scanning aperture and is reflected from the light condensing surface,
wherein the photodetector 16 is arranged at a position at which the straight line connecting the center of the light condensing surface and the center of the light receiving means, and a perpendicular line of the scanning aperture form an angle of about 60° around the rotating shaft.

(9) A bar code reader having:
a housing having a scanning aperture;
a rotating portion having a rotating shaft in the housing;
a light condensing surface mounted on the rotating portion; and
light receiving means for receiving light which passes through the scanning aperture and is reflected from the light condensing surface,
wherein the photodetector is arranged at a position at which, when a vector directing from the center of the light condensing surface to the center of the photodetector is rotated 60° around the rotating shaft, the vector and the normal-line vector of the scanning aperture form generally the minimum angle.

(10) The bar code reader as described in the paragraphs (7) through (9), further having:
a light source which is fastened in the housing, and emits light;
a first reflecting surface fastened in the housing; and
a second reflecting surface arranged in the vicinity of the light condensing surface as one body,
wherein the light emitted from the light source is reflected from the first reflecting surface, subsequently is reflected from the second reflecting surface, and is emitted from the scanning aperture.

(11) An optical component including:
a photodetector having a photoelectric conversion surface;
a band-pass filter; and
a plastic component which is made by injection molding as one body,
wherein the plastic component is provided with: a reflecting surface; a light-shielding case; a reflecting surface formed outside the light-shielding case by evaporation; an opening provided in the light-shielding case; a first mounting surface provided in the vicinity of the periphery of the inside of the opening; a space from the first mounting surface; and a second mounting surface provided on the further inner side in the vicinity of the space, and
the band-pass filter is tightly fastened to the first mounting surface, and the above-mentioned photodetector is tightly fastened to the second mounting surface.

(12) A bar code reader, wherein
the light-shielding case is arranged in such a way that the optical component as described in the paragraph (11) is fastened in the housing as described in the paragraph (10), the reflecting surface as described in the paragraph (11) forms the first reflecting surface as described the paragraph (10), and the light-shielding case as described in the paragraph (11) forms the photodetector as described in the paragraph (10).

As described above, according to the present embodiment, there may be provided a bar code reader which is preferable for a smaller size and a lighter weight, has a excellent signal to noise ratio, and is preferable for object recognition. Moreover, according to the present embodiment, there may be provided a bar code reader which has a small number of components, and is cheap in assembly costs and adjusting costs.

What is claimed is:

1. A bar code reader comprising:
light source means;
deflecting means having a deflecting surface by which emitted light emitted from the light source means is deflected;
scanning means for emitting light deflected by the deflecting means toward a bar code for scanning;

light condensing means for condensing return light from the bar code;

light receiving means for receiving the return light condensed by the light condensing means; and a fixed base which supports the deflecting means in a rotation adjustable manner such that a rotation center of the deflecting means coincides with an extended portion of the deflecting surface.

2. The bar code reader according to claim 1, further comprising light-receiving range decision means arranged offset on a rotation center axis of the deflecting means and disposed on a return optical path for return light entering the light receiving means.

3. The bar code reader according to claim 2, wherein the light-receiving range decision means is a field diaphragm for the light receiving means.

4. The bar code reader according to claim 3, wherein a band-pass filter is fastened to the field diaphragm.

5. The bar code reader according to claim 2, wherein the light-receiving range decision means is a light receiving surface of the light receiving means.

6. The bar code reader according to claim 2, wherein the light-receiving range decision means and the deflecting means are formed as one body, and the light-receiving range decision means is rotated along with rotation of the deflecting means.

7. The bar code reader according to claim 6, wherein the light-receiving range decision means and the deflecting means are formed as one body by molding.

8. A bar code reader comprising:

light source means;

scanning means for scanning emitted light from the light source means toward an object;

reflecting and light condensing means for reflecting and condensing return light from the object;

light receiving means for receiving the return light reflected and condensed by the reflecting and light condensing means; and a housing which has thereon the light source means, the scanning means, the reflecting and light condensing means, and the light receiving means, and has a scanning aperture through which emitted light from the scanning means and reflected light from the object pass, wherein the reflecting and light condensing means is mounted on the housing in such a way that an angle formed by a perpendicular line of the scanning aperture, and a straight line connecting a center of the reflecting and light condensing means and a center of the light receiving means is about 60°.

9. The bar code reader according to claim 8, wherein the reflecting and light condensing means includes a concave reflecting mirror.

10. The bar code reader according to claim 9, wherein the scanning aperture is formed in a rectangular shape with a longer side in a scanning direction of the emitted light scanned by the scanning means when the scanning aperture is seen along a direction of the perpendicular line of the scanning aperture, and the light receiving means is disposed to a side, in the scanning direction, of the scanning aperture.

11. The bar code reader according to claim 10, wherein the light source means is also disposed to the side, in the scanning direction, of the scanning aperture.

12. The bar code reader according to claim 11, wherein the light receiving means and the light source means are disposed along a direction orthogonal to the scanning direction.

13. The bar code reader according to claim 8, wherein the light receiving means includes a photodetector having a photoelectric conversion surface.

14. The bar code reader according to claim 8, wherein the light receiving means includes a photodetector, and a field diaphragm disposed in front of the photodetector.

15. The bar code reader according to claim 8, wherein the light receiving means includes a photodetector and a band-pass filter disposed in front of the photodetector.

16. A bar code reader comprising:

light source means;

scanning means for scanning emitted light from the light source means toward an object;

reflecting and light condensing means for reflecting and condensing return light from the object;

light receiving means for receiving the return light reflected and condensed by the reflecting and light condensing means; and a housing which has thereon the light source means, the scanning means, the reflecting and light condensing means, and the light receiving means, and has a scanning aperture through which emitted light from the scanning means and reflected light from the object pass, wherein the reflecting and light condensing means is mounted on the housing in such a way that an angle formed by a perpendicular line of the scanning aperture, and a perpendicular line of the light receiving means is about 60°.

* * * * *